United States Patent
Yamasaki et al.

(10) Patent No.: US 11,375,506 B2
(45) Date of Patent: Jun. 28, 2022

(54) COMMUNICATION TERMINAL MEASUREMENT SYSTEM, COMMUNICATION TERMINAL MEASUREMENT APPARATUS, AND COMMUNICATION TERMINAL TEST METHOD

(71) Applicant: ANRITSU CORPORATION, Kanagawa (JP)

(72) Inventors: Toru Yamasaki, Kanagawa (JP); Daiki Kano, Kanagawa (JP); Yuki Naruse, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 17/158,384

(22) Filed: Jan. 26, 2021

(65) Prior Publication Data
US 2021/0243759 A1 Aug. 5, 2021

(30) Foreign Application Priority Data

Jan. 30, 2020 (JP) .............................. JP2020-013490
Jan. 30, 2020 (JP) .............................. JP2020-013492
Nov. 18, 2020 (JP) .............................. JP2020-191900

(51) Int. Cl.
*H04W 24/00* (2009.01)
*H04W 72/04* (2009.01)
(Continued)

(52) U.S. Cl.
CPC ....... *H04W 72/0453* (2013.01); *H04W 24/08* (2013.01); *H04W 72/082* (2013.01)

(58) Field of Classification Search
CPC .......... H04W 72/0453; H04W 72/082; H04W 24/08; H04W 88/06; H04W 24/06;
(Continued)

(56) References Cited

U.S. PATENT DOCUMENTS 11,115,134 B2 * 9/2021 Jaulin ................... H04B 1/406
2020/0309846 A1 * 10/2020 Barthel .............. G01R 31/2837

OTHER PUBLICATIONS

Kazuki Takeda, et al., "NR Physical Layer Specification in 5G", NTT Docomo, Technical Journal, vol. 26, No. 3, Nov. 2018.
(Continued)

*Primary Examiner* — Siu M Lee
(74) *Attorney, Agent, or Firm* — Pearne & Gordon LLP

(57) ABSTRACT

An object of the present invention is to provide a communication terminal measurement system capable of testing a mobile communication terminal compatible with a plurality of communication standards having overlapping frequency bands in a state where the frequency bands overlap. In the communication terminal measurement system according to the present invention, the control apparatus 31 acquires the second frequency band information from the second storage unit 21*m* of the second mobile terminal measurement apparatus 21, and inputs parameters for avoiding all or a part of the frequency band to the storage unit 20*m* of the first mobile terminal measurement apparatus 20, whereby avoiding the mobile communication terminal 11*a* from refusing to receive signals due to input of signals of both two communication standards.

19 Claims, 26 Drawing Sheets

(51) Int. Cl.
*H04W 72/08* (2009.01)
*H04W 24/08* (2009.01)

(58) Field of Classification Search
CPC ........ H04W 16/14; H04L 1/24; H04L 5/0048; H04L 5/005
See application file for complete search history.

(56) References Cited

OTHER PUBLICATIONS

"Successful demonstration experiment of new technology for coexisting 5G with 4G LTE in the same Frequency band", KDDI Research Institute, Inc., news release, Sep. 4, 2018.

* cited by examiner

| Antenna configuration | Number of CRS Ports | Remarks |
|---|---|---|
| Single antenna | 1 | |
| Receiver diversity | 1 | |
| Transmit diversity | 2 | |
| 2x2 MIMO(TM3) | 2 | |
| 2x2 MIMO(TM4) | 2 | |
| 2x2 MIMO(TM6) | 2 | |
| 4x2 MIMO(TM3) | 4 | |
| 4x2 MIMO(TM4) | 4 | |
| 4x4 MIMO(TM3) | 4 | |
| 4x4 MIMO(TM4) | 4 | |
| 4x4 MIMO(TM9) | 2 | TM9 is 2CRS due to LTE Implementation |

FIG. 10

COMMUNICATION TERMINAL MEASUREMENT SYSTEM, COMMUNICATION TERMINAL MEASUREMENT APPARATUS, AND COMMUNICATION TERMINAL TEST METHOD

TECHNICAL FIELD

The present disclosure relates to a communication terminal measurement system, a communication terminal measurement apparatus, and a communication terminal test method, which test a communication terminal that can support a plurality of communication standards.

BACKGROUND ART

In order to support services that require low latency and high reliability in a wide area such as Connected Car, the introduction of 5th generation mobile communication system (5G) that is not compatible with existing 4th generation mobile communication system (4G (LTE)) is being considered (see, for example, Non-Patent Document 1).

RELATED ART DOCUMENT

Non-Patent Document

[Non-Patent Document 1] "NR Physical Layer Specification in 5G", NTT DOCOMO, Technical Journal, Vol. 26 No. 3, November 2018

[Non-Patent Document 2] "Successful demonstration experiment of new technology for coexisting 5G with 4G LTE in the same frequency band", KDDI Research Institute, Inc., news release, Sep. 4, 2018

DISCLOSURE OF THE INVENTION

Problem that the Invention is to Solve

At the stage of transition from 4G to 5G, it is necessary for 4G and 5G to coexist. However, the frequency bands of 4G and 5G overlap, and it is conceivable that interference between systems will occur. Here, if frequencies are distributed and operated during the period in which 4G and 5G coexist in order to avoid interference between systems, there arises a problem that frequency utilization efficiency is lowered due to unequal distribution of users. For this reason, experiments have also been conducted in which frequencies are flexibly distributed within the frequency band (see, for example, Non-Patent Document 2).

Further, at the stage of transition from 4G to 5G, terminals are required to have a function capable of performing communication with both communication standards. A communication terminal measurement system for testing such terminals has a problem that it is necessary to enable the test to be performed while avoiding interference between the two standards even when the frequencies of both communication standards overlap.

In order to solve the above problems, an object of the present invention is to provide a communication terminal measurement system, a communication terminal measurement apparatus, and a communication terminal test method which are capable of testing a mobile communication terminal compatible with a plurality of communication standards having overlapping frequency bands, in a state where the frequency bands overlap.

Means for Solving the Problem

In order to achieve the above object, a communication terminal measurement system according to claim 1 of the present invention is a communication terminal measurement system which includes a first mobile terminal measurement apparatus (20) compatible with a first communication standard for mobile communication in which one symbol is composed of a plurality of subcarriers, a second mobile terminal measurement apparatus (21) compatible with a second communication standard for mobile communication in which one symbol is composed of a plurality of subcarriers, and a control apparatus (31) that controls the first mobile terminal measurement apparatus and the second mobile terminal measurement apparatus, and tests a mobile communication terminal (11a) compatible with the first communication standard and the second communication standard, by transmitting and receiving test signals (St1, St2) between the mobile communication terminal and either of the first mobile terminal measurement apparatus or the second mobile terminal measurement apparatus, in which the first mobile terminal measurement apparatus has a first storage unit (20m) that stores first frequency band information about the test signal of the first communication standard, the second mobile terminal measurement apparatus has a second storage unit (21m) that stores second frequency band information about the test signal of the second communication standard, and the control apparatus acquires the second frequency band information from the second storage unit, and performs output control for turning off an output of the test signal of the first communication standard for a part of the first frequency band, with respect to the first mobile terminal measurement apparatus, when the first frequency band and the second frequency band overlap.

In the communication terminal measurement system according to claim 2, the part of the first frequency band is the second frequency band.

With this configuration, in the communication terminal measurement system according to claim 2 of the present invention, based on the band information of the first communication standard and the band information of the second communication standard, the mobile terminal measurement apparatus compatible with the first communication standard can transmit the test signal of the first communication standard, while avoiding the region where the test signals of the first communication standard and the second communication standard overlap, and the mobile terminal measurement apparatus compatible with the second communication standard can transmit the test signal of the second communication standard in the frequency band of the overlapping region. Therefore, in the communication terminal measurement system according to claim 2 of the present invention, it is possible to avoid the mobile communication terminal from refusing to receive signals due to input of test signals of both the first communication standard and the second communication standard.

In the communication terminal measurement system according to claim 3, the first communication standard is NR, and the second communication standard is LTE, the second storage unit stores "DL Center Channel" and "DL Channel Bandwidth" as the second frequency band information, and the control apparatus uses the "DL Center Channel" as "LTE DL Channel", and uses the "DL Channel Bandwidth" as "LTE Channel Bandwidth", and causes the first mobile terminal measurement apparatus to perform the output control.

In the communication terminal measurement system according to claim 4 of the present invention, the second storage unit (21*m*) further stores mapping information in which a reference signal of the second communication standard is represented by the symbols and the subcarriers, the control apparatus further acquires the mapping information from the second storage unit, and the part of the first frequency band is a region in which the reference signal based on the mapping information is disposed.

With this configuration, in the communication terminal measurement system according to claim 4 of the present invention, the test signal of the first communication standard (NR) can be transmitted, while avoiding the symbol on which the reference signal of the second communication standard is disposed, based on the mapping information of the second communication standard (LTE).

The control apparatus of the communication terminal measurement system according to claim 5 includes an input unit (32) into which the mapping information is input, and an operation unit (33) that causes the second storage unit to update the existing mapping information to the mapping information input from the input unit, and causes the first mobile terminal measurement apparatus to perform the output control based on the updated mapping information.

In the communication terminal measurement system according to claim 5 of the present invention, mapping information can be updated at any timing by providing an input unit and an operation unit, and the test signal of the first communication standard (NR) can be transmitted according to the updated mapping information.

In the communication terminal measurement system according to claim 6, the first communication standard is NR, and the second communication standard is LTE, the second storage unit stores "DL Center Channel" and "DL Channel Bandwidth" as the second frequency band information, and stores "Antenna Configuration" and "Cell ID" as the mapping information, and the control apparatus uses the "DL Center Channel" as "LTE DL Channel", and uses the "DL Channel Bandwidth" as "LTE Channel Bandwidth", converts the "Antenna Configuration" into "Number of CRS Ports", based on a conversion table, converts the "Cell ID" into "LTE v-Shift" by performing surplus operation by 6, and causes the first mobile terminal measurement apparatus to perform the output control.

In the communication terminal measurement system according to claim 7, the region is a subcarrier unit within the symbol.

In the communication terminal measurement system according to claim 7 of the present invention, the signal of the first communication standard can be transmitted in the region where the reference signal is not disposed, while avoiding the reference signal of the second communication standard on a resource element basis.

In the communication terminal measurement system according to claim 8, the region is a symbol unit.

In the communication terminal measurement system according to claim 8 of the present invention, the signal of the first communication standard can be transmitted in the region where the reference signal is not disposed, while avoiding the reference signal of the second communication standard on a resource block basis.

In the communication terminal measurement system according to claim 9, the second storage unit (21*m*) further stores downlink data channel information which is a resource block (RB) occupied by a downlink data signal of the second frequency band from the second mobile terminal measurement apparatus to the mobile communication terminal, the control apparatus further acquires the downlink data channel information, and the part of the first frequency band is a band in which the resource block based on the downlink data channel information is present.

In the communication terminal measurement system according to claim 10, the downlink data channel information is a start position of the resource block on a lowest frequency side and the number of the resource blocks.

With this configuration, in the communication terminal measurement system according to claims 9 and 10 of the present invention, the test signal of the first communication standard (NR) can be transmitted, while avoiding the resource block occupied by the downlink data signal of the second communication standard, based on the downlink data channel information of the second communication standard (LTE).

In the communication terminal measurement system according to claim 11, the first communication standard is NR, and the second communication standard is LTE, the second storage unit stores "DL Center Channel" and "DL Channel Bandwidth" as the second frequency band information, stores "DL RMC-Starting RB" as the start position of the resource block, and stores "DLRMC-Number of RB" as the number of the resource blocks, and the control apparatus uses the "DL Center Channel" as "LTE DL Channel", uses the "DL Channel Bandwidth" as "LTE Channel Bandwidth", uses the "DL RMC-Starting RB" as "LTE DL Starting RB", uses the "DLRMC-Number of RB" as "LTE DL Number of RB", and causes the first mobile terminal measurement apparatus to perform the output control.

Further, a communication terminal measurement apparatus according to claim 12 of the present invention is a mobile terminal measurement apparatus (201) including a first storage unit (20*m*) that is compatible with a first communication standard for mobile communication in which one symbol is composed of a plurality of subcarriers, and stores first frequency band information about a test signal (St1) of the first communication standard; a first transmission and reception unit (20*a*) that transmits and receives a test signal compatible with the first communication standard; a second storage unit (21*m*) that is compatible with a second communication standard for mobile communication in which one symbol is composed of a plurality of subcarriers, and stores second frequency band information about a test signal (St2) of the second communication standard; and a second transmission and reception unit (21*a*) that transmits and receives a test signal of the second communication standard, in which when testing a mobile communication terminal (11*a*) compatible with the first communication standard and the second communication standard by transmitting and receiving the test signals (St1, St2) between the mobile communication terminal and either of the first transmission and reception unit or the second transmission and reception unit, the first transmission and reception unit acquires the second frequency band information from the second storage unit, and performs output control for turning off an output of the test signal of the first communication standard for a part of the first frequency band, when the first frequency band and the second frequency band overlap.

In the communication terminal measurement apparatus according to claim 13, the part of the first frequency band is the second frequency band.

With this configuration, in the communication terminal measurement apparatus according to claim 13 of the present invention, based on the frequency band information of the second communication standard (LTE) of the second transmission and reception unit, while avoiding the region where the test signals of the first communication standard and the second communication standard overlap, the first transmission and reception unit can transmit the test signal of the first communication standard, and the second transmission and reception unit can transmit the test signal of the second communication standard in the frequency band of the overlapping region. Therefore, in the communication terminal measurement apparatus according to claim 13 of the present invention, it is possible to avoid the mobile communication terminal from refusing to receive signals due to input of test signals of both the first communication standard and the second communication standard.

In the communication terminal measurement apparatus according to claim 14, the second storage unit (21m) further stores mapping information in which a reference signal of the second communication standard is represented by the symbols and the subcarriers, the first transmission and reception unit further acquires the mapping information from the second storage unit, and the part of the first frequency band is a region in which the reference signal based on the mapping information is disposed.

With this configuration, the communication terminal measurement apparatus according to claim 14 of the present invention can transmit the test signal of the first communication standard (NR) to the first transmission and reception unit, while avoiding the symbol on which the reference signal of the second communication standard is disposed, based on the mapping information of the second communication standard (LTE) of the second transmission and reception unit.

In the communication terminal measurement apparatus according to claim 15, the second storage unit (21m) further stores downlink data channel information which is a resource block (RB) occupied by a downlink data signal of the second frequency band from the second mobile terminal measurement apparatus to the mobile communication terminal, the first transmission and reception unit further acquires the downlink data channel information, and the part of the first frequency band is a band in which the resource block based on the downlink data channel information is present.

With this configuration, the communication terminal measurement apparatus according to claim 15 of the present invention can transmit the test signal of the first communication standard (NR) to the first transmission and reception unit, while avoiding the resource block occupied by the downlink data signal of the second communication standard, based on the downlink data channel information of the second communication standard (LTE) of the second transmission and reception unit.

Further, a communication terminal test method according to claim 16 of the present invention is a communication terminal test method which controls a first storage unit (20m) that is compatible with a first communication standard for mobile communication in which one symbol is composed of a plurality of subcarriers, and stores first frequency band information about a test signal (St1) of the first communication standard, a first transmission and reception unit (20a) that transmits and receives a test signal compatible with the first communication standard, a second storage unit (21m) that is compatible with a second communication standard for mobile communication in which one symbol is composed of a plurality of subcarriers, and stores second frequency band information about a test signal (St2) of the second communication standard, and a second transmission and reception unit (21a) that transmits and receives a test signal of the second communication standard, and tests a mobile communication terminal (11a) compatible with the first communication standard and the second communication standard by transmitting and receiving the test signals (St1, St2) between the mobile communication terminal and either of the first transmission and reception unit or the second transmission and reception unit, the method including: acquiring the second frequency band information from the second storage unit (step S01); checking overlap between the first frequency band and the second frequency band (step S02); and performing output control for turning off an output of the test signal of the first communication standard for a part of the first frequency band, with respect to the first transmission and reception unit, when the first frequency band and the second frequency band overlap (step S03).

In the communication terminal test method according to claim 17, the part of the first frequency band is the second frequency band.

With this configuration, in the communication terminal test method according to claim 17 of the present invention, based on the frequency band information of the second communication standard (LTE), while avoiding the region where the test signals of the first communication standard and the second communication standard overlap, the mobile terminal measurement apparatus or the first transmission and reception unit compatible with the first communication standard can transmit the test signal of the first communication standard, and the mobile terminal measurement apparatus or the second transmission and reception unit compatible with the second communication standard can transmit the test signal of the second communication standard in the frequency band of the overlapping region. Therefore, in the communication terminal test method according to claim 17 of the present invention, it is possible to avoid the mobile communication terminal from refusing to receive signals due to input of test signals of both the first communication standard and the second communication standard.

In the communication terminal test method according to claim 18, the second storage unit (21m) further stores mapping information in which a reference signal of the second communication standard is represented by the symbols and the subcarriers, when the second frequency band information is acquired from the second storage unit, the mapping information is further acquired from the second storage unit, and the part of the first frequency band is a region in which the reference signal based on the mapping information is disposed.

With this configuration, the communication terminal test method according to claim 18 of the present invention can transmit the test signal of the first communication standard (NR) to the first mobile terminal measurement apparatus, while avoiding the symbol on which the reference signal of the second communication standard is disposed, based on the mapping information of the second communication standard (LTE) of the second mobile terminal measurement apparatus.

In the communication terminal test method according to claim 19, the second storage unit (21m) further stores downlink data channel information which is a resource block (RB) occupied by a downlink data signal of the second frequency band from the second mobile terminal measurement apparatus to the mobile communication terminal, when the second frequency band information is acquired from the second storage unit, the downlink data channel information is further acquired, and the part of the first frequency band is a band in which the resource block based on the downlink data channel information is present.

With this configuration, the communication terminal test method according to claim 19 of the present invention can transmit the test signal of the first communication standard (NR) to the first mobile terminal measurement apparatus, while avoiding the resource block occupied by the downlink data signal of the second communication standard, based on the downlink data channel information of the second communication standard (LTE) of the second mobile terminal measurement apparatus.

The above inventions can be combined as much as possible.

Advantage of the Invention

According to the present invention, it is possible to provide a communication terminal measurement system, a control apparatus, and a communication terminal test method which are capable of testing a mobile communication terminal compatible with a plurality of communication standards having overlapping frequency bands in a state where the frequency bands overlap.

BRIEF DESCRIPTION OF THE DRAWINGS

FIG. 10 is a diagram illustrating a conversion table included in the control apparatus of the communication terminal measurement system according to the present invention.

BEST MODE FOR CARRYING OUT THE INVENTION

Hereinafter, embodiments of the present invention will be described with reference to the drawings. The embodiment described below is an example of the present invention, and the present invention is not limited to the following embodiment. In this specification and the drawings, constituent elements having the same reference signs are assumed to be the same.

Embodiment 1

Figure 1:
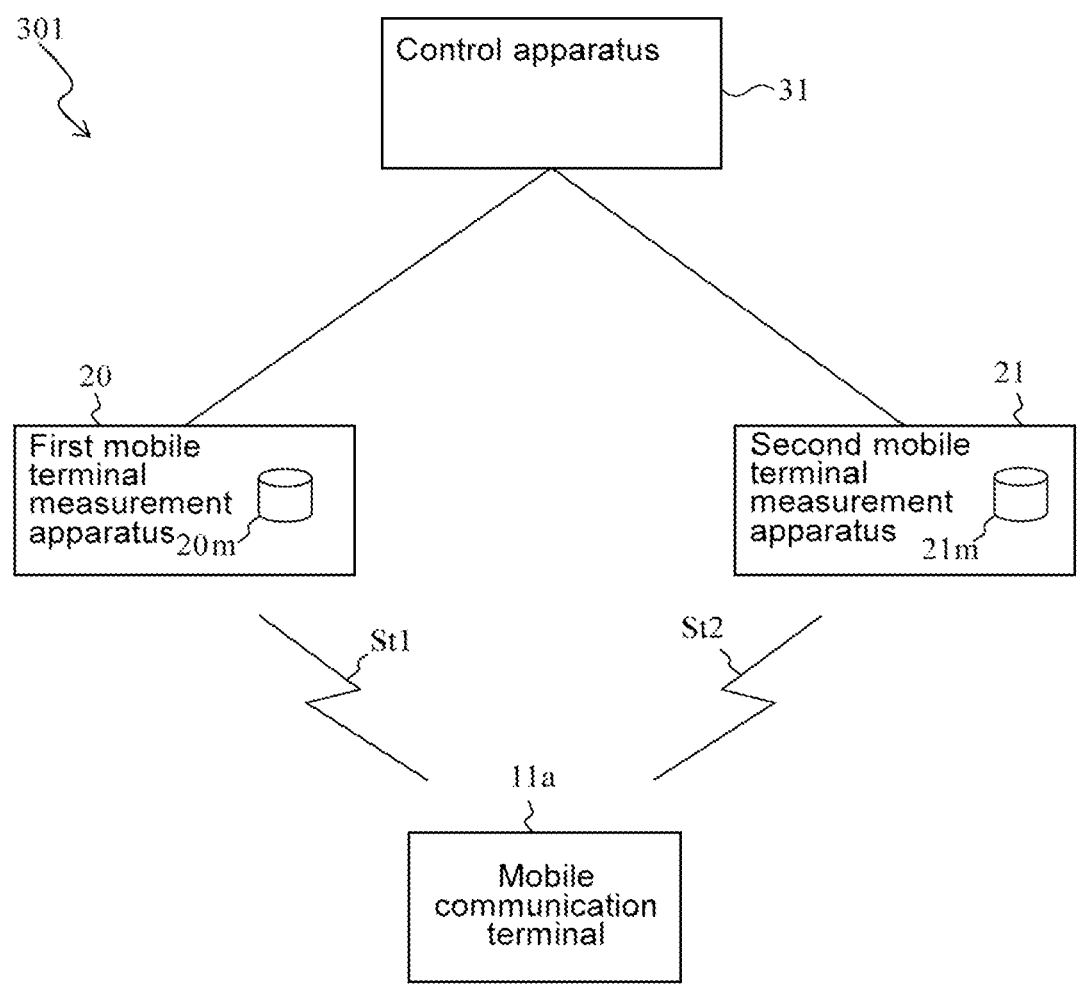
FIG. 1 is a diagram illustrating a communication terminal measurement system according to the present invention.

FIG. 1 is a diagram illustrating a communication terminal measurement system 301 of the present embodiment. The communication terminal measurement system 301 includes a first mobile terminal measurement apparatus 20 compatible with a first communication standard for mobile communication in which one symbol is composed of a plurality of subcarriers, a second mobile terminal measurement apparatus 21 compatible with a second communication standard for mobile communication in which one symbol is composed of a plurality of subcarriers, and a control apparatus 31 that controls the first mobile terminal measurement apparatus 20 and the second mobile terminal measurement apparatus 21. The communication terminal measurement system 301 tests a mobile communication terminal 11a compatible with the first communication standard and the second communication standard by transmitting and receiving test signals (St1, St2) between the mobile communication terminal 11a and the first mobile terminal measurement apparatus 20 and the second mobile terminal measurement apparatus 21. The test of the mobile communication terminal 11a is, for example, measurement of downlink throughput.

The first mobile terminal measurement apparatus 20 has a first storage unit 20m that stores first frequency band information about the test signal St1 of the first communication standard. The second mobile terminal measurement apparatus 21 has a second storage unit 21m that stores second frequency band information about the test signal St2 of the second communication standard.

The control apparatus acquires the second frequency band information and the mapping information from the second storage unit 21m, and performs output control for turning off an output of the test signal St1 of the first communication standard for the second frequency band, to the first mobile terminal measurement apparatus 20, when the first frequency band and the second frequency band overlap.

Figure 2:
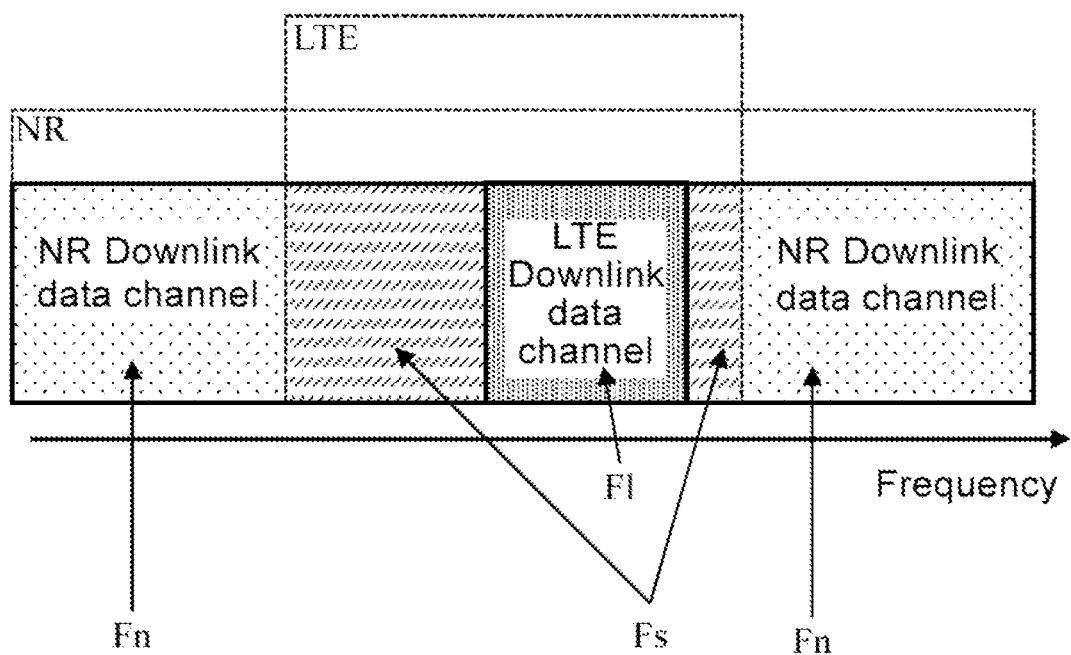
FIG. 2 is a diagram illustrating frequency bands.

In the present embodiment, the case where the first communication standard is NR (5G) and the second communication standard is LTE (4G) will be described. FIG. 2 is a diagram illustrating frequency bands of NR and LTE in the present embodiment. As shown in FIG. 2, the frequency bands of NR and LTE overlap. The frequency Fn in the frequency bands which do not overlap is used for the downlink data of NR. Further, the frequency Fl present in a part of the section, where the frequency bands overlap, is used for the downlink data of LTE. When the downlink data of NR is transmitted at the frequency Fl, the LTE and NR signals interfere with each other and the data is damaged. Therefore, the downlink data of the NR is not transmitted at the frequency Fl.

On the other hand, the frequency Fs is present in the other part of the section where the frequency bands overlap. The frequency Fs is used for LTE reference signals. The reference signal is a Cell specific Reference Signal (CRS), which is a unique signal used for measuring downlink reception quality and the like. If the NR downlink data signal and the LTE reference signal also interfere with each other, the data will be damaged, so that the NR downlink data is not transmitted even at the frequency Fs.

As described above, in order for the first mobile terminal measurement apparatus 20 to transmit the downlink data signal while avoiding the downlink data signal and the reference signal of the LTE, the first mobile terminal measurement apparatus 20 needs to acquire the second frequency band information used for the downlink data signal and the reference signal of the LTE, as illustrated in FIG. 2. The second frequency band information is stored in the second storage unit 21m of the second mobile terminal measurement apparatus 21. Therefore, the control apparatus 31 acquires the second frequency band information from the second storage unit 21m of the second mobile terminal measurement apparatus 21.

Specifically, the second storage unit 21m stores "DL Center Channel (median frequency)" and "DL Channel Bandwidth (frequency bandwidth)" as the second frequency band information (LTE frequency band information).

Since these parameters are for LTE, the control apparatus 31 converts these parameters into parameters for NR. Specifically, the control apparatus 31 uses "DL Center Channel" as "LTE DL Channel", and uses "DL Channel Bandwidth" as "LTE Channel Bandwidth".

Subsequently, the control apparatus 31 performs "output control". A specific example of the "output control" will be described.

The control apparatus 31 inputs, for example, the converted parameters as a Radio Resource Control (RRC), to the storage unit 20m of the first mobile terminal measurement apparatus 20. The first mobile terminal measurement apparatus 20 outputs a downlink data signal (test signal St1) according to the parameters input to the storage unit 20m so as to avoid the frequency band used for the LTE reference signal and downlink data signal.

Figure 3:
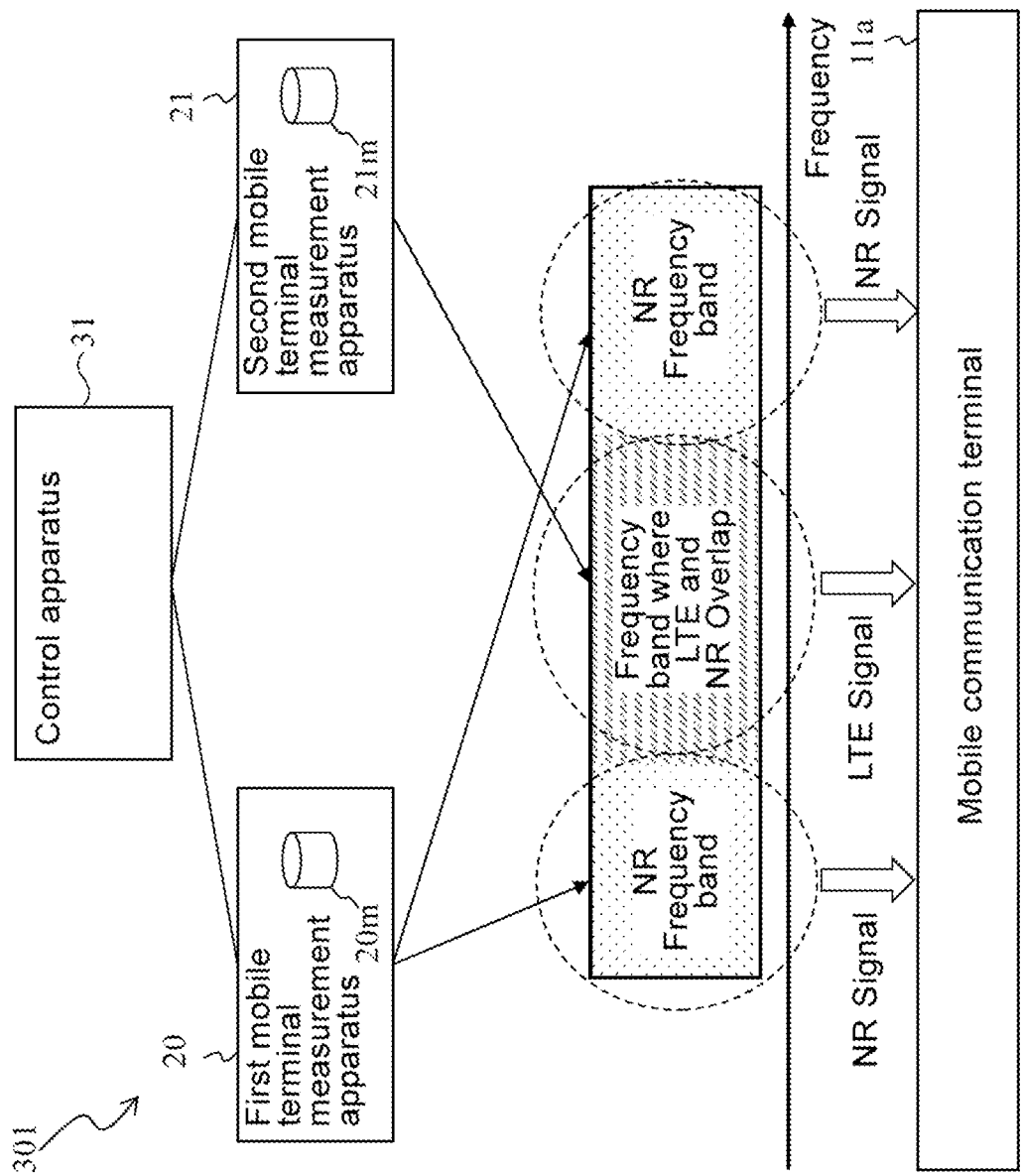
FIG. 3 is a diagram illustrating an effect of the communication terminal measurement system according to the present invention.

FIG. 3 is a diagram illustrating the effect of the communication terminal measurement system 301. The control apparatus 31 causes the first mobile terminal measurement apparatus 20 not to output the downlink data signal, in the band where the LTE frequency band and the NR frequency band overlap, which allows the mobile communication terminal 11a to receive the downlink data signal and the reference signal of the second mobile terminal measurement apparatus 21.

As described above, in the communication terminal measurement system 301, the control apparatus 31 acquires the second frequency band information from the second storage unit 21m of the second mobile terminal measurement apparatus 21, and performs output control, that is, inputs parameters for avoiding the frequency band to the storage unit 20m of the first mobile terminal measurement apparatus 20. Therefore, in the communication terminal measurement system 301, it is possible to avoid the mobile communication terminal 11a from refusing to receive signals due to input of both NR and LTE signals.

Further, the communication terminal measurement system 301 acquires only necessary parameters from the second storage unit 21m of the second mobile terminal measurement apparatus 21, and inputs the acquired parameters to the first storage unit 20m of the first mobile terminal measurement apparatus 20, thereby reducing the amount of communication from the second mobile terminal measurement apparatus 21 to the first mobile terminal measurement apparatus 20 and the amount of information processing of the control apparatus 31.

Embodiment 2

Figure 4:
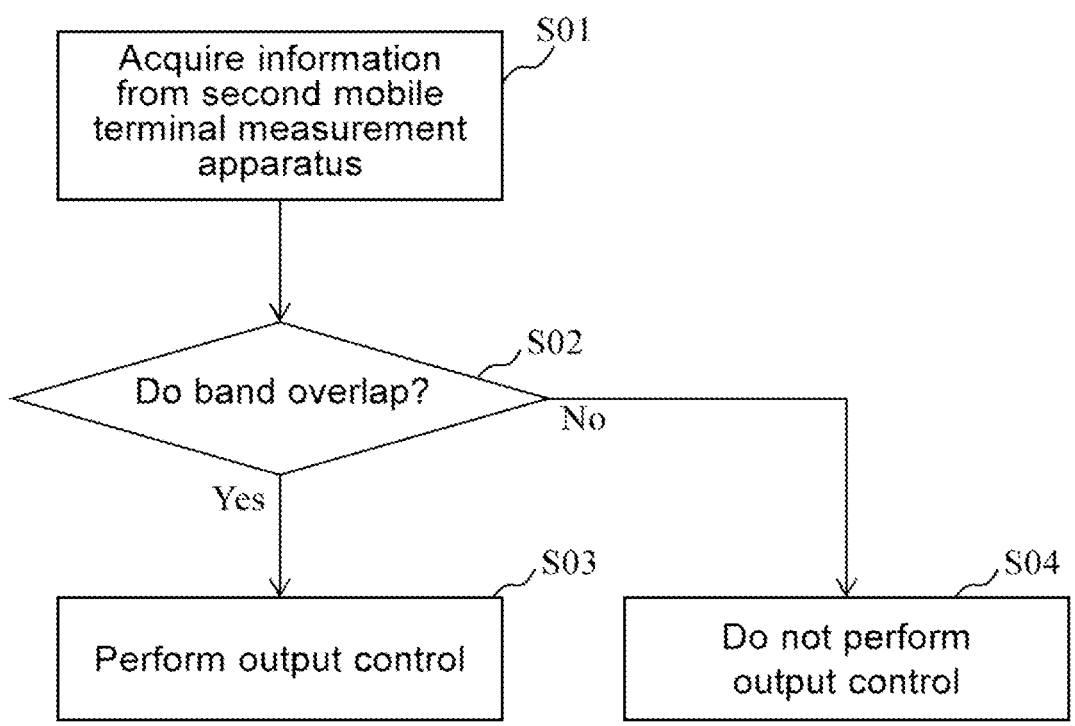
FIG. 4 is a diagram illustrating a communication terminal test method according to the present invention.

FIG. 4 is a diagram illustrating a communication terminal test method performed by the communication terminal measurement system 301 of the present embodiment. The communication terminal test method includes a step (S01) of acquiring the second frequency band information from the second storage unit 21m, a step (S02) of checking the overlap between the first frequency band and the second frequency band, and a step (S03) of performing output control for turning off an output of the test signal of the first communication standard for the second frequency band, with respect to the first mobile terminal measurement apparatus 20, when the first frequency band and the second frequency band overlap.

Specifically, first, in step S01, the control apparatus 31 acquires the second frequency band information (LTE frequency band represented by frequencies Fl and Fs in FIG. 2) from the second storage unit 21m of the second mobile terminal measurement apparatus 21.

Subsequently, in step S02, the control apparatus 31 checks whether or not the first frequency band (NR frequency band) and the second frequency band (LTE frequency band) overlap. Here, the first frequency band may be preset, or may be acquired from the first storage unit 20m of the first mobile terminal measurement apparatus 20, by the control apparatus 31.

When the first frequency band and the second frequency band overlap ("Yes" in step S02), the control apparatus 31 performs the output control, that is, inputs parameters for avoiding the frequency band to the storage unit 20m of the first mobile terminal measurement apparatus 20 (step S03). Thus, the first mobile terminal measurement apparatus 20 outputs a downlink data signal (test signal St1) according to the parameters input to the storage unit 20m so as to avoid the region where the LTE reference signal is disposed.

On the other hand, when the first frequency band and the second frequency band do not overlap ("No" in step S02), the control apparatus 31 does not perform the output control (step S04). The case where the first frequency band and the second frequency band do not overlap includes the case where the second mobile terminal measurement apparatus 21 does not output the test signal St2 of the second communication standard to the mobile communication terminal 11a. In such a case, the first mobile terminal measurement apparatus 20 outputs a downlink data signal (test signal St1) by using the entire first frequency band.

As described above, in the communication terminal test method of the present embodiment, the control apparatus 31 acquires the second frequency band information from the second storage unit 21m of the second mobile terminal measurement apparatus 21, and inputs parameters for avoiding the frequency band to the storage unit 20m of the first mobile terminal measurement apparatus 20, thereby avoiding the mobile communication terminal 11a from refusing to receive signals due to input of both NR and LTE signals.

Embodiment 3

Figure 5:
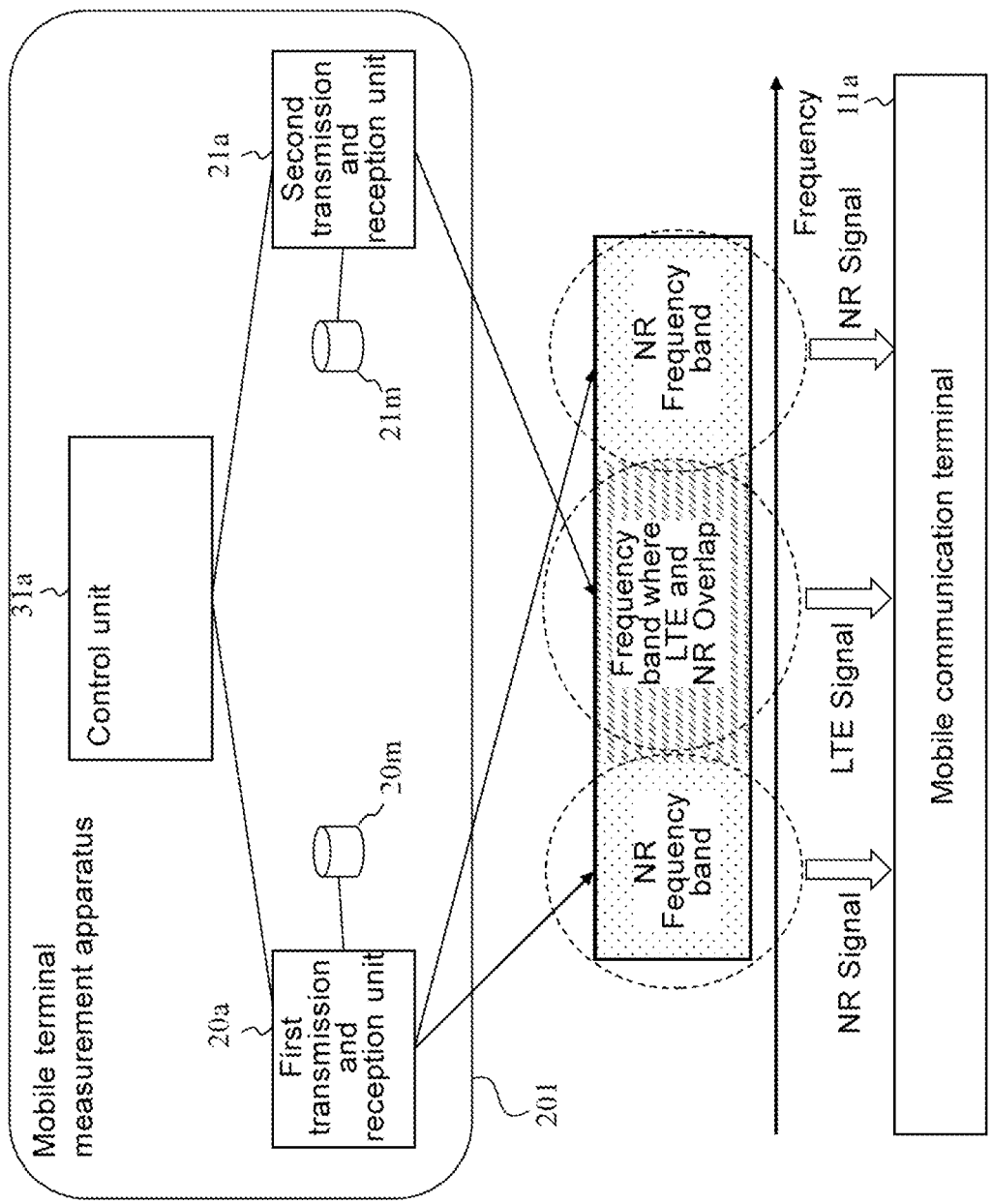
FIG. 5 is a diagram illustrating a communication terminal measurement apparatus according to the present invention.

FIG. 5 is a diagram illustrating the mobile terminal measurement apparatus 201 of the present embodiment. The mobile terminal measurement apparatus 201 includes a first storage unit 20m that corresponds to a first communication standard for mobile communication in which one symbol is composed of a plurality of subcarriers, and stores first frequency band information about a test signal St1 of the first communication standard; a first transmission and reception unit 20a that transmits and receives a test signal compatible with the first communication standard; a second storage unit 21m that corresponds to a second communication standard for mobile communication in which one symbol is composed of a plurality of subcarriers, and stores second frequency band information about a test signal St2 of the second communication standard; a second transmission and reception unit 21a that transmits and receives a test signal of the second communication standard, and a control unit 31a that controls the first transmission and reception unit and the second transmission and reception unit.

The mobile terminal measurement apparatus 201 tests the mobile communication terminal 11a compatible with the first communication standard and the second communication standard by transmitting and receiving the test signals (St1, St2) between the mobile communication terminal 11a and the first transmission and reception unit and the second transmission and reception unit.

The control unit 31a acquires the second frequency band information from the second storage unit, and performs output control for turning off an output of the test signal of the first communication standard for the second frequency band, with respect to the first transmission and reception unit, when the first frequency band and the second frequency band overlap.

Even in the present embodiment, as illustrated in FIG. 2, the first communication standard may be NR (5G) and the second communication standard may be LTE (4G). The second frequency band information is stored in the second storage unit 21m of the second mobile terminal measurement apparatus 21. The specific information stored in the second storage unit 21m is the same as the information described in Embodiment 1. Therefore, the control unit 31a acquires the second frequency band information from the second storage unit 21m and converts these from LTE to NR.

Subsequently, the control unit 31a performs "output control". The "output control" of the present embodiment is the same as the "output control" described in Embodiment 1.

Further, the mobile terminal measurement apparatus 201 can similarly execute the communication terminal test method described with reference to FIG. 4.

Embodiment 4

Figure 6:
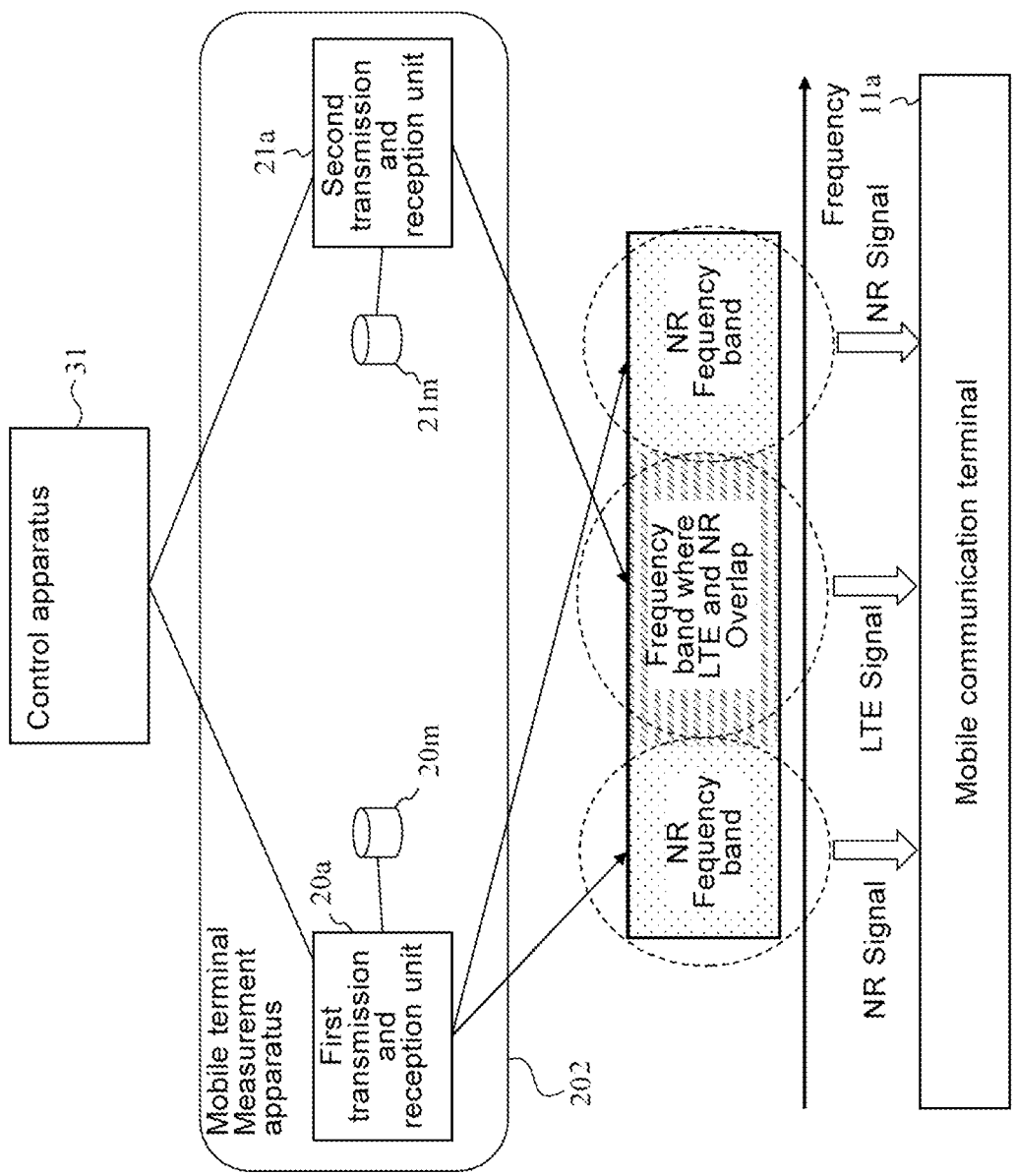
FIG. 6 is a diagram illustrating a communication terminal measurement apparatus according to the present invention.

FIG. 6 is a diagram illustrating the mobile terminal measurement apparatus 202 of the present embodiment. The mobile terminal measurement apparatus 202 includes a first storage unit 20m that corresponds to a first communication standard for mobile communication in which one symbol is composed of a plurality of subcarriers, and stores first frequency band information about a test signal St1 of the first communication standard, a first transmission and reception unit 20a that transmits and receives a test signal compatible with the first communication standard, a second storage unit 21m that corresponds to a second communication standard for mobile communication in which one symbol is composed of a plurality of subcarriers, and stores second frequency band information about a test signal St2 of the second communication standard, and a second transmission and reception unit 21a that transmits and receives a test signal of the second communication standard.

The mobile terminal measurement apparatus 202 tests the mobile communication terminal 11a compatible with the first communication standard and the second communication standard by transmitting and receiving the test signals (St1, St2) between the mobile communication terminal 11a and the first transmission and reception unit 20a and the second transmission and reception unit 21a.

The difference between the mobile terminal measurement apparatus 202 and the mobile terminal measurement apparatus 201 of FIG. 5 is that the mobile terminal measurement apparatus 202 does not have the control unit 31a and is controlled by the external control apparatus 31. That is, with respect to the first transmission and reception unit 20a, the control apparatus 31 acquires the second frequency band information from the second storage unit 21m, and performs output control for turning off an output of the test signal of the first communication standard for the second frequency band, when the first frequency band and the second frequency band overlap.

Even in the present embodiment, as illustrated in FIG. 2, the first communication standard may be NR (5G) and the second communication standard may be LTE (4G). The second frequency band information is stored in the second storage unit 21m of the second mobile terminal measurement apparatus 21. The specific information stored in the second storage unit 21m is the same as the information described in Embodiment 1. Therefore, the control unit 31a acquires the second frequency band information from the second storage unit 21m and converts these from LTE to NR.

Subsequently, the control unit 31a performs "output control". The "output control" of the present embodiment is the same as the "output control" described in Embodiment 1.

Further, the mobile terminal measurement apparatus 201 can similarly execute the communication terminal test method described with reference to FIG. 4.

In the present embodiment, the mobile terminal measurement apparatus 202 incorporating the first storage unit 20m and the second storage unit 21m has been described, but a configuration in which the control apparatus 31 includes at least one of the first storage unit 20m and the second storage unit 21m works in the same manner as described above.

Embodiment 5

Figure 7:
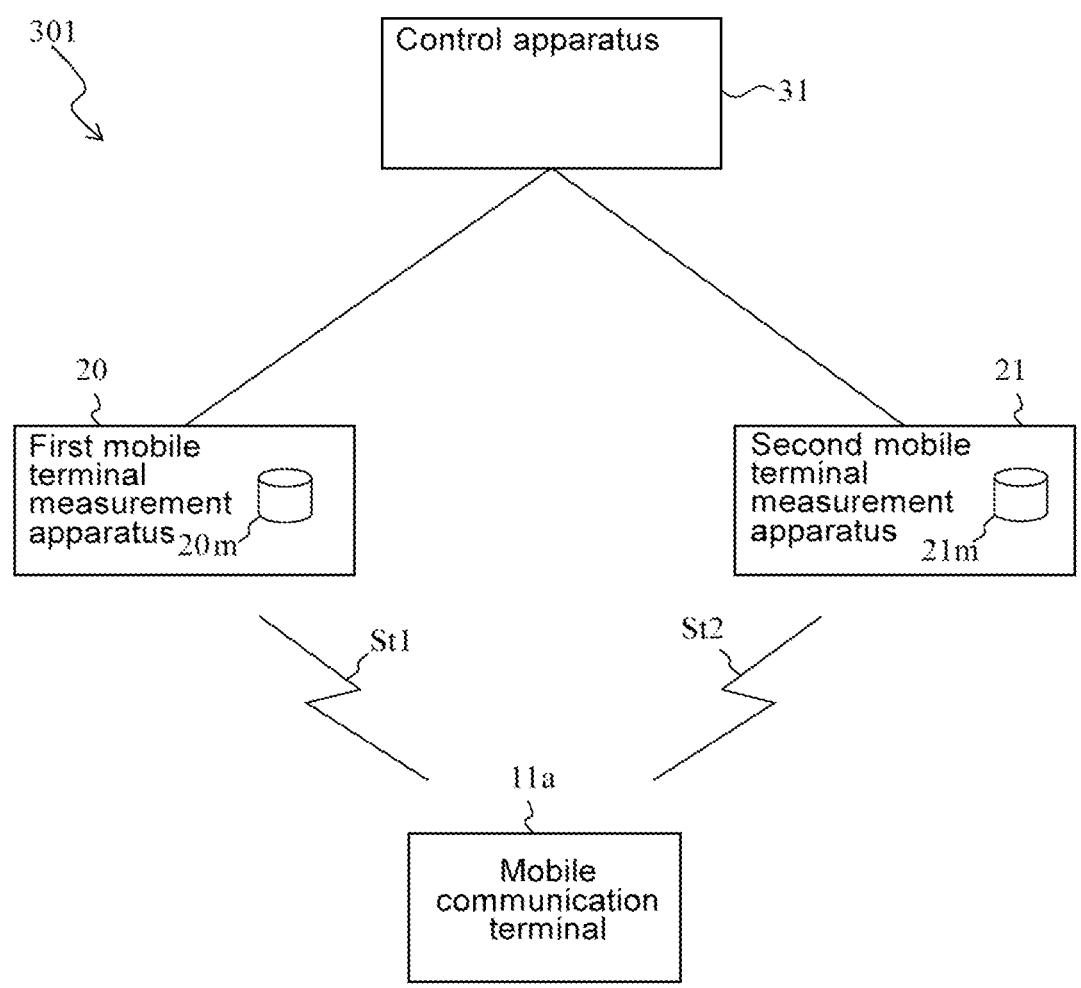
FIG. 7 is a diagram illustrating a communication terminal measurement system according to the present invention.

FIG. 7 is a diagram illustrating a communication terminal measurement system 301 of the present embodiment. The communication terminal measurement system 301 includes a first mobile terminal measurement apparatus 20 compatible with a first communication standard for mobile communication in which one symbol is composed of a plurality of subcarriers, a second mobile terminal measurement apparatus 21 compatible with a second communication standard for mobile communication in which one symbol is composed of a plurality of subcarriers, and a control apparatus 31 that controls the first mobile terminal measurement apparatus 20 and the second mobile terminal measurement apparatus 21. The communication terminal measurement system 301 tests a mobile communication terminal 11a compatible with the first communication standard and the second communication standard by transmitting and receiving test signals (St1, St2) between the mobile communication terminal 11a and the first mobile terminal measurement apparatus 20 and the second mobile terminal measurement apparatus 21. The test of the mobile communication terminal 11a is, for example, measurement of downlink throughput.

The first mobile terminal measurement apparatus 20 has a first storage unit 20m that stores first frequency band information about the test signal St1 of the first communication standard. The second mobile terminal measurement apparatus 21 has a second storage unit 21m that stores the second frequency band information regarding the test signal St2 of the second communication standard, and the mapping information in which the reference signal of the second communication standard is represented by the symbol and the subcarrier.

The control apparatus acquires the second frequency band information and the mapping information from the second storage unit 21m, and performs output control for turning off an output of the test signal St1 of the first communication standard for the region where the reference signal is disposed based on the mapping information, with respect to the first mobile terminal measurement apparatus 20, when the first frequency band and the second frequency band overlap.

Figure 8:
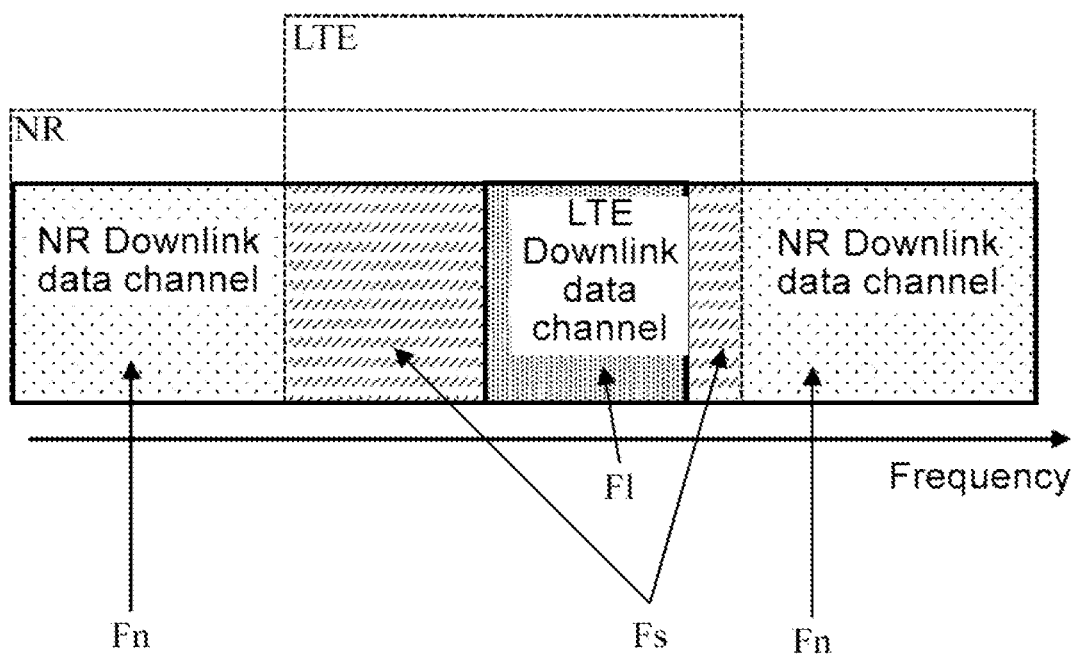
FIG. 8 is a diagram illustrating frequency bands.

In the present embodiment, the case where the first communication standard is NR (5G) and the second communication standard is LTE (4G) will be described. FIG. 8 is a diagram illustrating frequency bands of NR and LTE in the present embodiment. As shown in FIG. 8, the frequency bands of NR and LTE overlap. The frequency Fn in the frequency bands which do not overlap is used for the downlink data of NR. Further, the frequency Fl present in a part of the section, where the frequency bands overlap, is used for the downlink data of LTE. When the downlink data of NR is transmitted at the frequency Fl, the LTE and NR signals interfere with each other and the data is damaged. Therefore, the downlink data of the NR is not transmitted at the frequency Fl.

Figure 9:
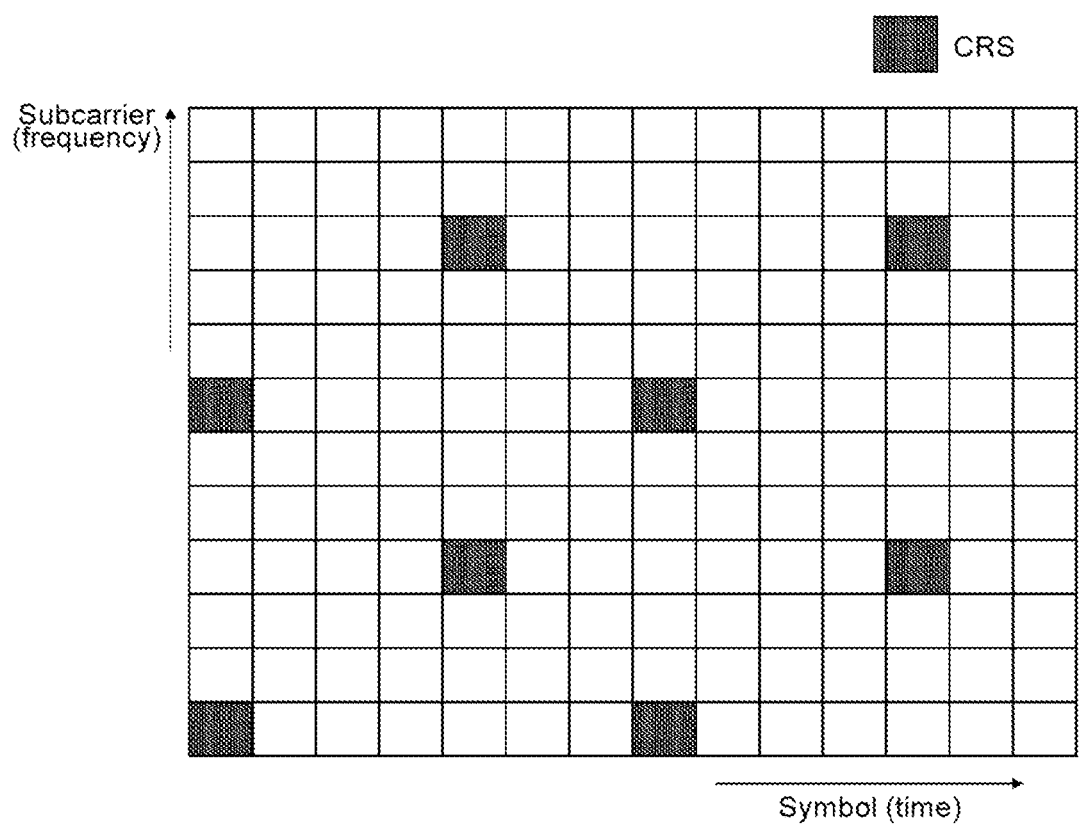
FIG. 9 is a diagram illustrating mapping information of a reference signal.

On the other hand, the frequency Fs is present in the other part of the section where the frequency bands overlap. The frequency Fs is used for LTE reference signals. The reference signal is a Cell specific Reference Signal (CRS), which is a unique signal used for measuring downlink reception quality and the like. If the downlink data signal of NR and the reference signal of LTE also interfere with each other, the data will be damaged. However, unlike the downlink data signal, the LTE reference signal does not occupy all the subcarriers as shown in FIG. 9. That is, the subcarriers not occupied by the LTE reference signal can be used for the downlink data signal (test signal St1) of NR, and the frequency utilization efficiency can be improved.

In order for the first mobile terminal measurement apparatus 20 to transmit the downlink data signal on a subcarrier that is not occupied by the LTE reference signal, the first mobile terminal measurement apparatus 20 needs to acquire the mapping information of the LTE reference signal as shown in FIG. 9. The mapping information of the LTE reference signal is stored in the second storage unit 21m of the second mobile terminal measurement apparatus 21. Therefore, the control apparatus 31 acquires the mapping information of the reference signal from the second storage unit 21m of the second mobile terminal measurement apparatus 21.

Specifically, the second storage unit 21m stores "DL Center Channel (median frequency)" and "DL Channel Bandwidth (frequency bandwidth)" as the second frequency band information (LTE frequency band information), and "Antenna Configuration" and "Cell ID" as the mapping information.

Since these parameters are for LTE, the control apparatus 31 converts these parameters into parameters for NR. Specifically, the control apparatus 31 uses "DL Center Channel" as "LTE DL Channel", uses "DL Channel Bandwidth" as "LTE Channel Bandwidth", converts the "Antenna Configuration" into "Number of CRS Ports", based on the conversion table of FIG. 10, and converts the "Cell ID" into "LTE v-Shift" by performing surplus operation by 6.

Subsequently, the control apparatus 31 performs "output control". A specific example of the "output control" will be described.

The control apparatus 31 inputs, for example, the converted parameters as a Radio Resource Control (RRC), to the storage unit 20m of the first mobile terminal measurement apparatus 20. The first mobile terminal measurement apparatus 20 outputs a downlink data signal (test signal St1) according to the parameters input to the storage unit 20m so as to avoid the region where the LTE reference signal is disposed.

Here, the "region" has the following two forms.

(1) The region is the subcarrier unit within the symbol.

Figure 11:
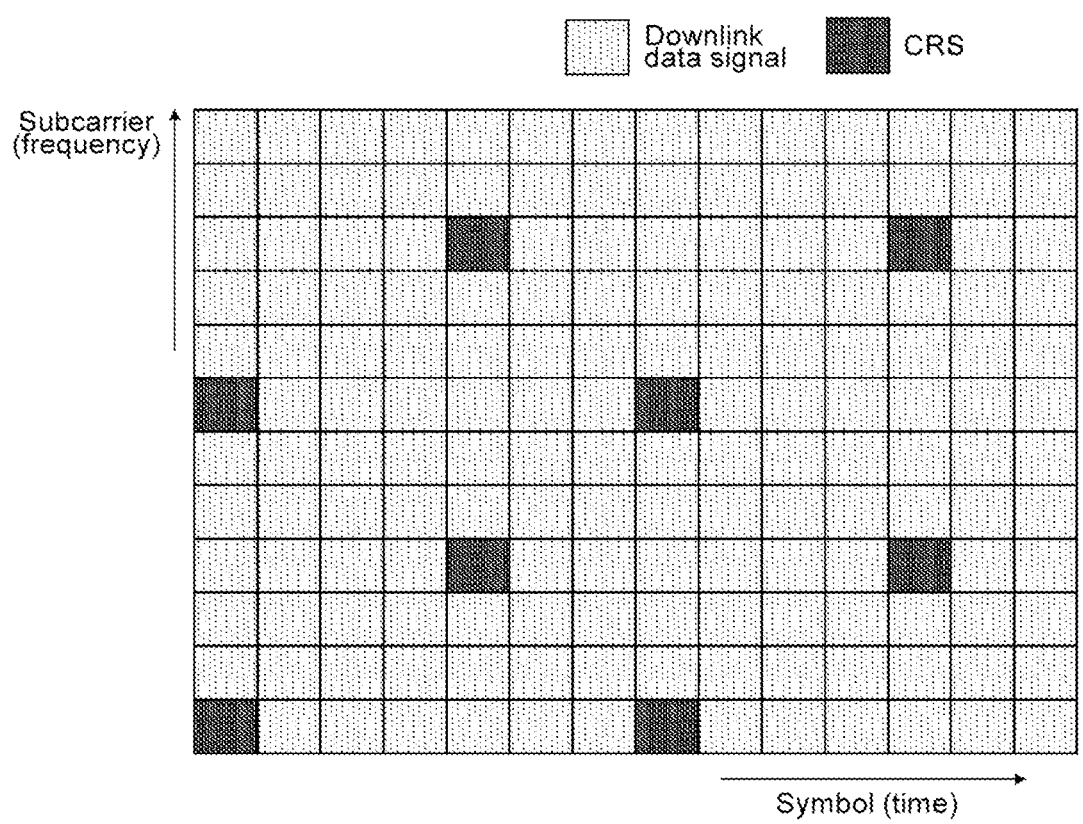
FIG. 11 is a diagram illustrating an effect of the communication terminal measurement system according to the present invention.

In this case, the first mobile terminal measurement apparatus 20 outputs a downlink data signal as shown in FIG. 11.

(2) The region is the symbol unit.

Figure 12:
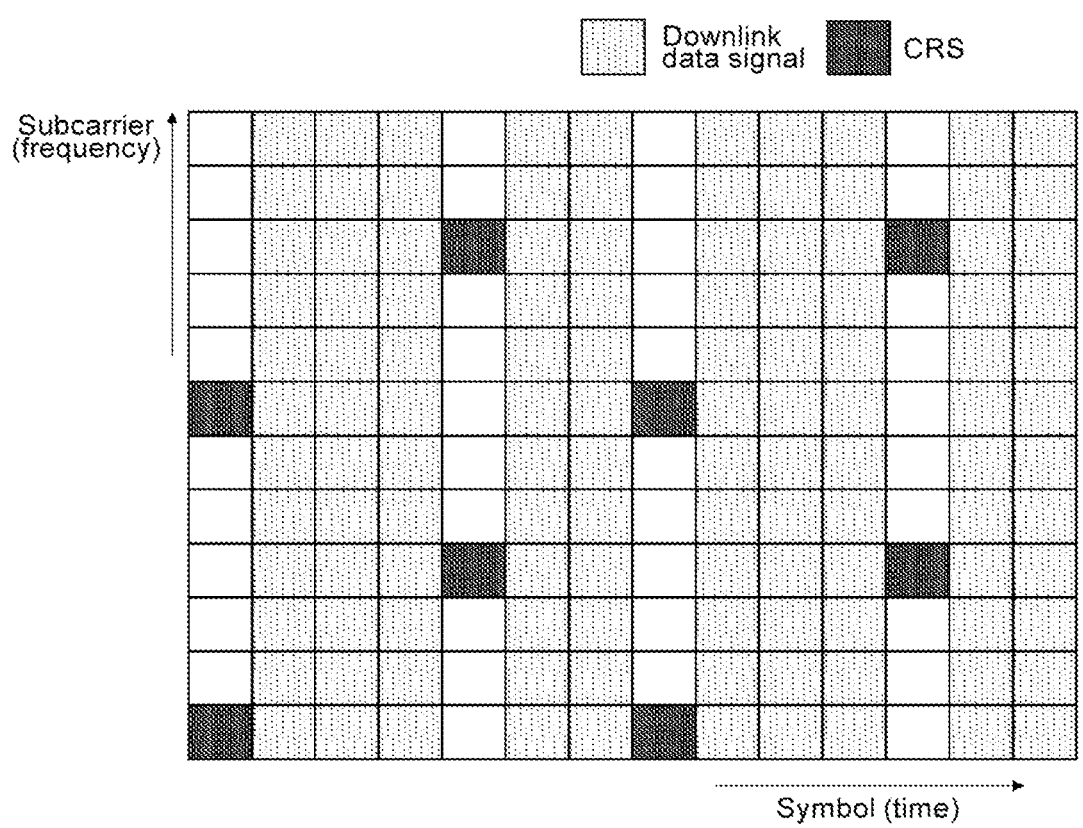
FIG. 12 is a diagram illustrating an effect of the communication terminal measurement system according to the present invention.

In this case, the first mobile terminal measurement apparatus 20 outputs a downlink data signal as shown in FIG. 12. In the case of this form, since "LTE v-Shift" is unnecessary, the number of parameters acquired from the second storage unit 21m of the second mobile terminal measurement apparatus 21 and the number of parameters to be input to the first storage unit 20m of the first mobile terminal measurement apparatus 20 are smaller than the numbers of the form (1).

As described above, in the communication terminal measurement system 301, the control apparatus 31 acquires the mapping information of the reference signal from the second storage unit 21m of the second mobile terminal measurement apparatus 21, and inputs parameters for avoiding the reference signals to the storage unit 20m of the first mobile terminal measurement apparatus 20, thereby improving the frequency utilization efficiency at the time of testing the mobile communication terminal 11a.

Further, the communication terminal measurement system 301 acquires only necessary parameters from the second storage unit 21m of the second mobile terminal measurement apparatus 21, and inputs the acquired parameters to the first storage unit 20m of the first mobile terminal measurement apparatus 20, thereby reducing the amount of communication from the second mobile terminal measurement apparatus 21 to the first mobile terminal measurement apparatus 20 and the amount of information processing of the control apparatus 31.

Embodiment 6

Figure 13:
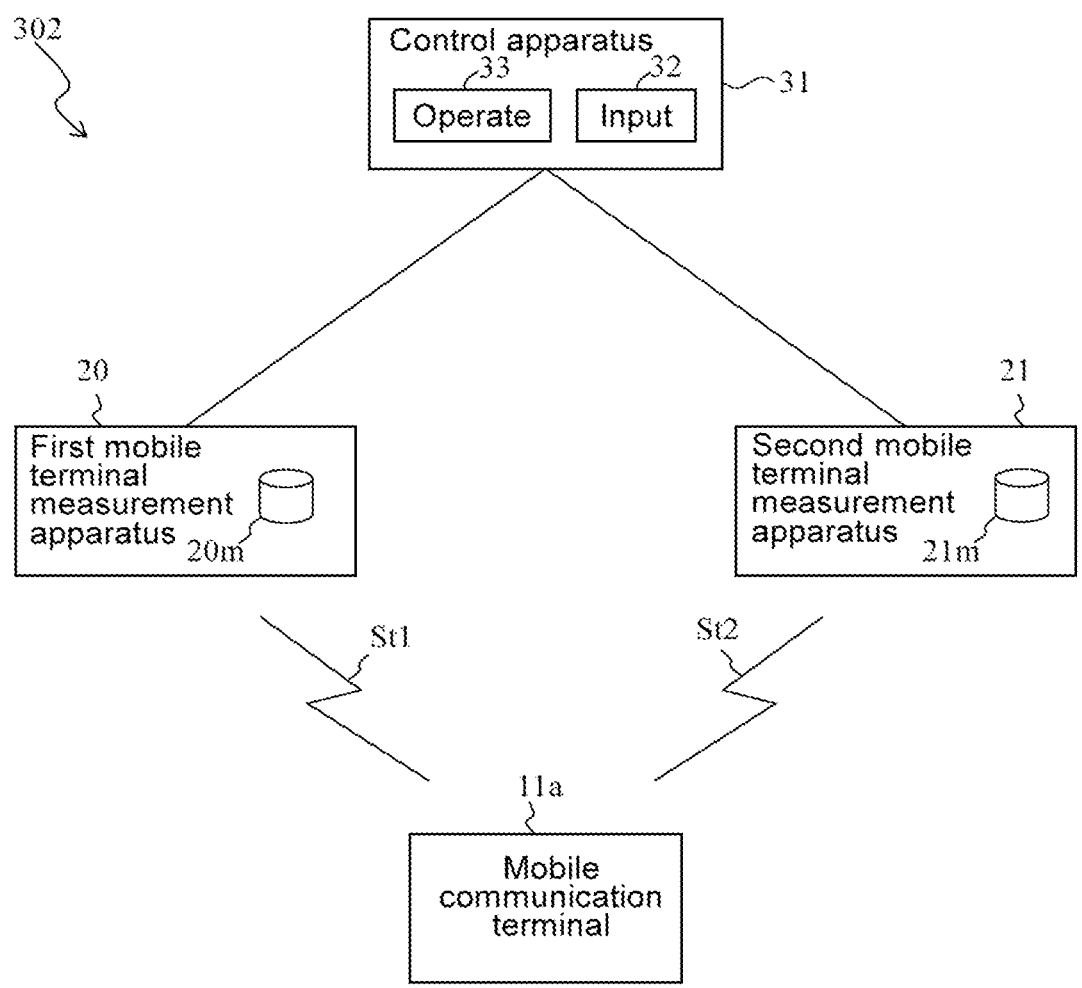
FIG. 13 is a diagram illustrating a communication terminal measurement system according to the present invention.

FIG. 13 is a diagram illustrating a communication terminal measurement system 302 of the present embodiment. As compared to the communication terminal measurement system 301 of FIG. 7, in the communication terminal measurement system 302, the control apparatus 31 includes an input unit 32 into which the mapping information is input, and an operation unit 33 that causes the second storage unit 21m to update the existing mapping information to the mapping information input from the input unit 32, and causes the first mobile terminal measurement apparatus 20 to perform the output control based on the updated mapping information.

The input unit 31 is, for example, a keyboard. The operator inputs information for rewriting the LTE mapping information from the input unit 31. The operation unit 33 is, for example, a confirmation key of a keyboard. After inputting new mapping information into the input unit 31, the operator operates the operation unit 33 to input the new mapping information into the second storage unit 21m of the second mobile terminal measurement apparatus 21. The second mobile terminal measurement apparatus 21 disposes a control signal in a region designated by a subcarrier and a symbol based on new mapping information, and outputs a test signal St2 to the mobile communication terminal 11a. The input unit 31 and the operation unit 33 may be a Graphical User Interface (GUI) displayed on the screen mounted on the control apparatus 31.

At the same time, as described in Embodiment 5, the control apparatus 31 acquires new mapping information from the second storage unit 21 and performs the output control, that is, inputs the parameter for avoiding the region where the reference signal is disposed, to the first storage unit 20m of the first mobile terminal measurement apparatus 20.

As described above, the communication terminal measurement system 302 can transmit the 5G downlink data signal (test signal St1) while avoiding the changed reference signal, even when the operator changes the mapping of the LTE reference signal.

Embodiment 7

Figure 14:
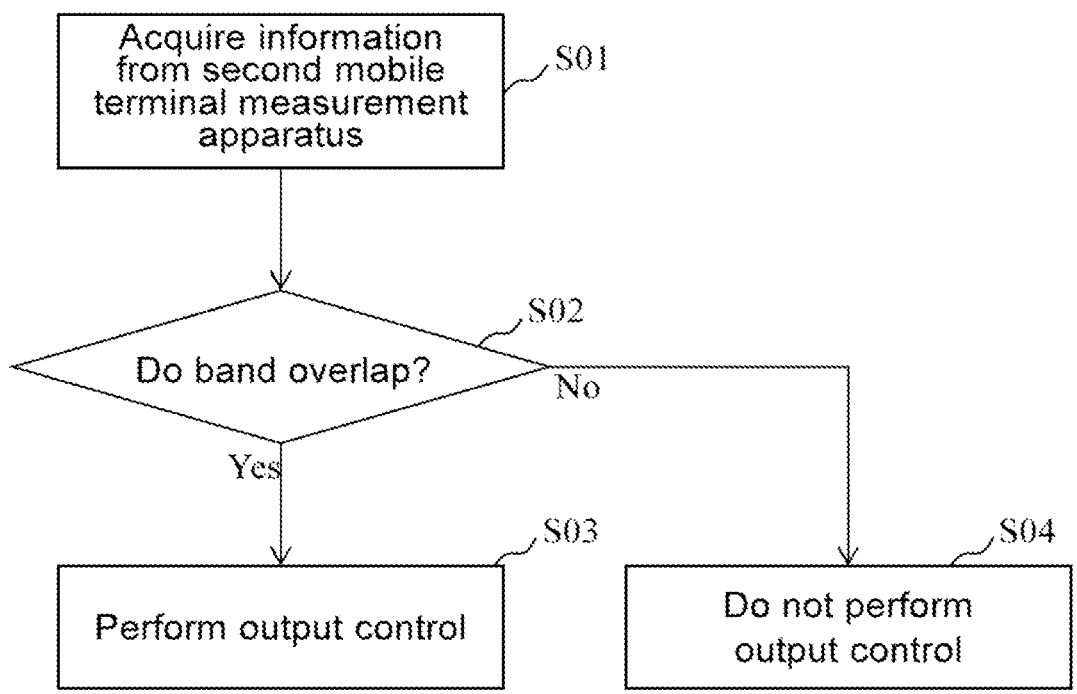
FIG. 14 is a diagram illustrating a communication terminal test method according to the present invention.

FIG. 14 is a diagram illustrating a communication terminal test method performed by the communication terminal measurement system (301 or 302) of the present embodiment. The communication terminal test method includes a step (S01) of acquiring the second frequency band information and the mapping information from the second storage unit 21m, a step (S02) of checking the overlap between the first frequency band and the second frequency band, and a step (S03) of performing output control for turning off an output of the test signal St1 of the first communication standard for the region in which the reference signal is disposed based on the mapping information, with respect to the first mobile terminal measurement apparatus 20, when the first frequency band and the second frequency band overlap.

Specifically, first, in step S01, the control apparatus 31 acquires the second frequency band information (LTE frequency band represented by frequencies Fl and Fs in FIG. 8) and mapping information of FIGS. 11 and 12, from the second storage unit 21m of the second mobile terminal measurement apparatus 21.

Subsequently, in step S02, the control apparatus 31 checks whether or not the first frequency band (NR frequency band) and the second frequency band (LTE frequency band) overlap. Here, the first frequency band may be preset, or may be acquired from the first storage unit 20m of the first mobile terminal measurement apparatus 20, by the control apparatus 31.

When the first frequency band and the second frequency band overlap ("Yes" in step S02), the control apparatus 31 performs the output control, that is, inputs parameters for avoiding the region where the reference signal is disposed to the first storage unit 20m of the first mobile terminal measurement apparatus 20 (step S03). Thus, the first mobile terminal measurement apparatus 20 outputs a downlink data signal (test signal St1) according to the parameters input to the storage unit 20m so as to avoid the region where the LTE reference signal is disposed.

On the other hand, when the first frequency band and the second frequency band do not overlap ("No" in step S02), the control apparatus 31 does not perform the output control (step S04). The case where the first frequency band and the second frequency band do not overlap includes the case where the second mobile terminal measurement apparatus 21 does not output the test signal St2 of the second communication standard to the mobile communication terminal 11a. In such a case, the first mobile terminal measurement apparatus 20 outputs a downlink data signal (test signal St1) by using the entire first frequency band.

As described above, in the communication terminal test method of the present embodiment, the control apparatus 31 acquires the mapping information of the reference signal from the second storage unit 21m of the second mobile terminal measurement apparatus 21, and inputs parameters for avoiding the reference signals to the storage unit 20m of the first mobile terminal measurement apparatus 20, thereby improving the frequency utilization efficiency at the time of testing the mobile communication terminal 11a.

Embodiment 8

Figure 15:
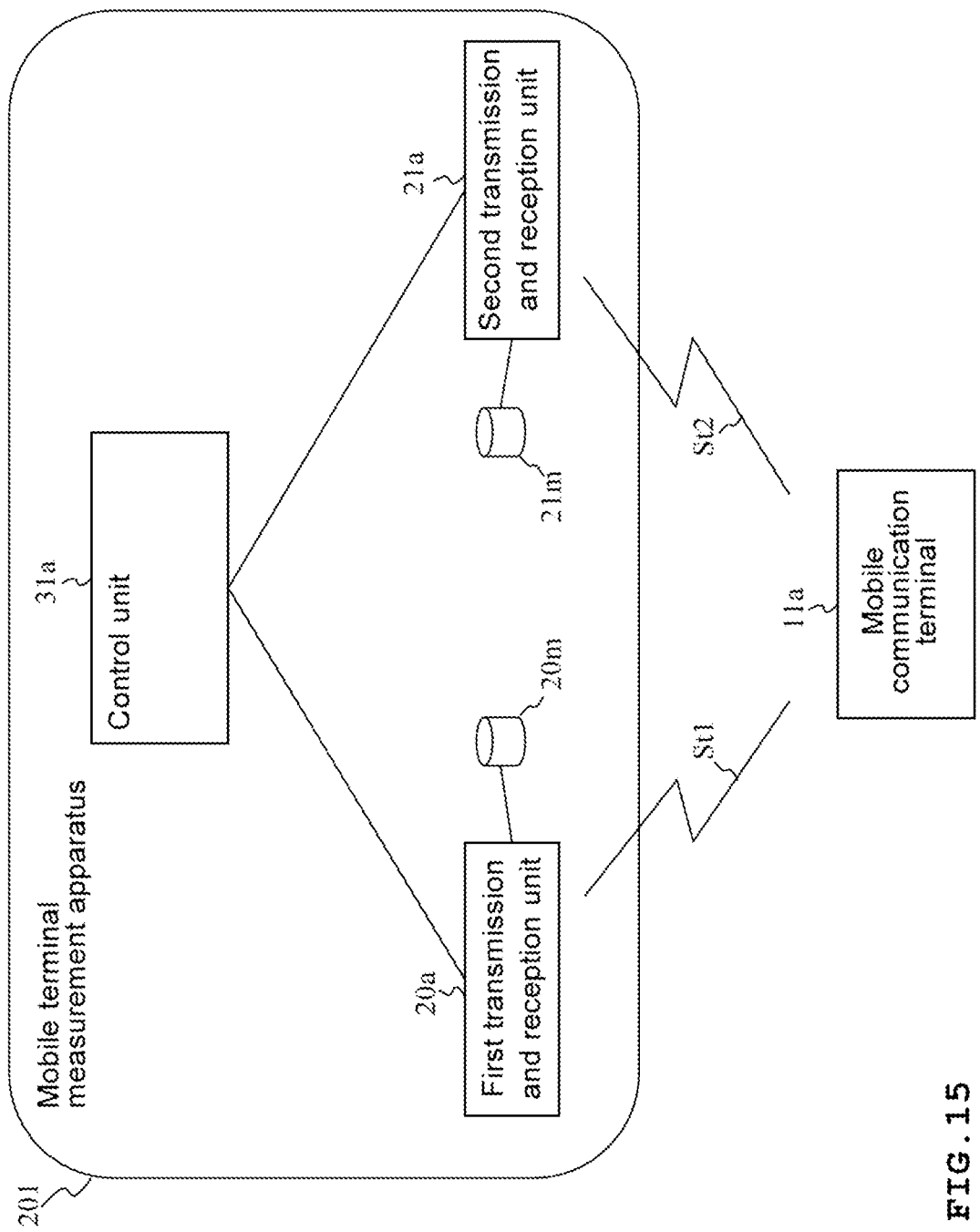
FIG. 15 is a diagram illustrating a communication terminal measurement apparatus according to the present invention.

FIG. 15 is a diagram illustrating the mobile terminal measurement apparatus 201 of the present embodiment. The mobile terminal measurement apparatus 201 includes a first storage unit 20m that corresponds to a first communication standard for mobile communication in which one symbol is composed of a plurality of subcarriers, and stores first frequency band information about a test signal St1 of the first communication standard, a first transmission and reception unit 20a that transmits and receives a test signal compatible with the first communication standard, a second storage unit 21m that corresponds to a second communication standard for mobile communication in which one symbol is composed of a plurality of subcarriers, and stores second frequency band information about a test signal St2 of the second communication standard and mapping information in which the reference signal of the second communication standard is represented by the symbol and the subcarrier, a second transmission and reception unit 21a that transmits and receives a test signal compatible with the second communication standard, and a control unit 31a that controls a first transmission and reception unit 20a and a second transmission and reception unit 21a.

The mobile terminal measurement apparatus 201 tests the mobile communication terminal 11a compatible with the first communication standard and the second communication standard by transmitting and receiving the test signals (St1, St2) between the mobile communication terminal 11a and the first transmission and reception unit 20a and the second transmission and reception unit 21a.

The control unit 31a acquires the second frequency band information and the mapping information from the second storage unit 21m, and performs output control for turning off an output of the test signal St1 of the first communication standard for the region in which the reference signal is disposed based on the mapping information, with respect to the first transmission and reception unit 20a, when the first frequency band and the second frequency band overlap.

Even in the present embodiment, as illustrated in FIG. 8, the first communication standard may be NR (5G) and the second communication standard may be LTE (4G). The mapping information of the LTE reference signal is stored in the second storage unit 21m. The specific information stored in the second storage unit 21m is the same as the information described in Embodiment 5. Therefore, the control unit 31a acquires the mapping information of the reference signal or the like from the second storage unit 21m and converts these from LTE to NR.

Subsequently, the control unit 31a performs "output control". The "output control" of the present embodiment is the same as the "output control" described in Embodiment 5.

Further, the mobile terminal measurement apparatus 201 can similarly execute the communication terminal test method described with reference to FIG. 14.

As described in Embodiment 6, the mobile terminal measurement apparatus 201 may also have an input unit and an operation unit. Following the change in the LTE mapping information, the 5G downlink data signal (test signal St1) can be transmitted while avoiding the reference signal.

Embodiment 9

Figure 16:
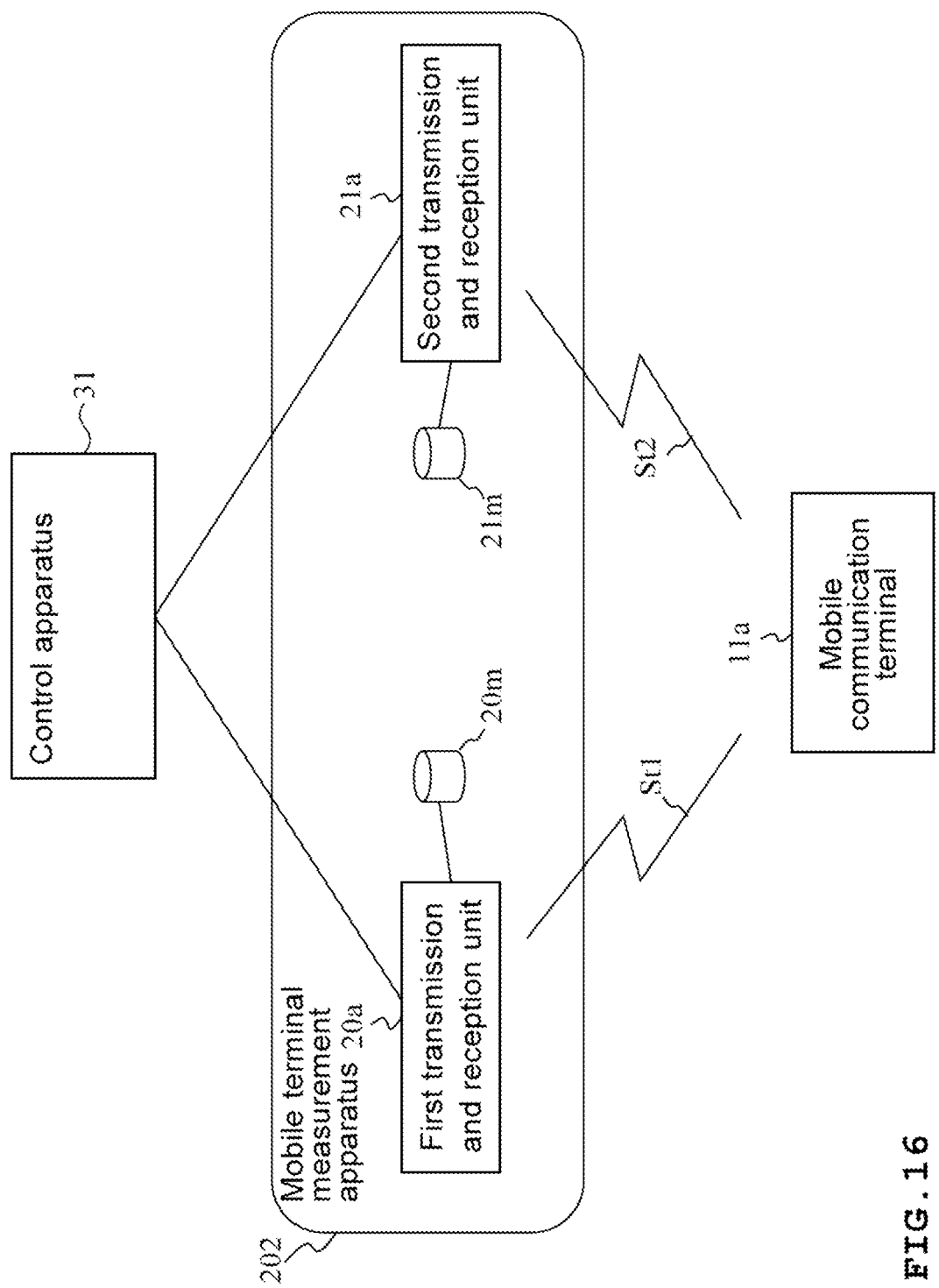
FIG. 16 is a diagram illustrating a communication terminal measurement apparatus according to the present invention.

FIG. 16 is a diagram illustrating the mobile terminal measurement apparatus 202 of the present embodiment. The mobile terminal measurement apparatus 202 includes a first storage unit 20m that corresponds to a first communication standard for mobile communication in which one symbol is composed of a plurality of subcarriers, and stores first frequency band information about a test signal St1 of the first communication standard, a first transmission and reception unit 20a that transmits and receives a test signal compatible with the first communication standard, a second storage unit 21m that corresponds to a second communication standard for mobile communication in which one symbol is composed of a plurality of subcarriers, and stores second frequency band information about a test signal St2 of the second communication standard and mapping information in which the reference signal of the second communication standard is represented by the symbol and the subcarrier, and a second transmission and reception unit 21a that transmits and receives a test signal compatible with the second communication standard.

The mobile terminal measurement apparatus 202 tests the mobile communication terminal 11a compatible with the first communication standard and the second communication standard by transmitting and receiving the test signals (St1, St2) between the mobile communication terminal 11a and the first transmission and reception unit 20a and the second transmission and reception unit 21a.

The difference between the mobile terminal measurement apparatus 202 and the mobile terminal measurement apparatus 201 of FIG. 15 is that the mobile terminal measurement apparatus 202 does not have the control unit 31a and is controlled by the external control apparatus 31. That is, with respect to the first transmission and reception unit 20a, the control apparatus 31 acquires the second frequency band information and the mapping information from the second storage unit 21m, and performs output control for turning off an output of the test signal St1 of the first communication standard for the region where the reference signal is disposed based on the mapping information, when the first frequency band and the second frequency band overlap.

Even in the present embodiment, as illustrated in FIG. 8, the first communication standard may be NR (5G) and the second communication standard may be LTE (4G). The mapping information of the LTE reference signal is stored in the second storage unit 21m. The specific information stored in the second storage unit 21m is the same as the information described in Embodiment 5. The control apparatus 31 acquires the mapping information of the reference signal or the like from the second storage unit 21m and converts these from LTE to NR.

Subsequently, the control apparatus 31 performs "output control". The "output control" of the present embodiment is the same as the "output control" described in Embodiment 5.

Further, the mobile terminal measurement apparatus 202 can similarly execute the communication terminal test method described with reference to FIG. 14.

As described in Embodiment 6, the mobile terminal measurement apparatus 202 may also have an input unit and an operation unit. Following the change in the LTE mapping information, the 5G downlink data signal (test signal St1) can be transmitted while avoiding the reference signal.

In the present embodiment, the mobile terminal measurement apparatus 202 incorporating the first storage unit 20m and the second storage unit 21m has been described, but a configuration in which the control apparatus 31 includes at least one of the first storage unit 20m and the second storage unit 21m works in the same manner as described above.

Embodiment 10

Figure 17:
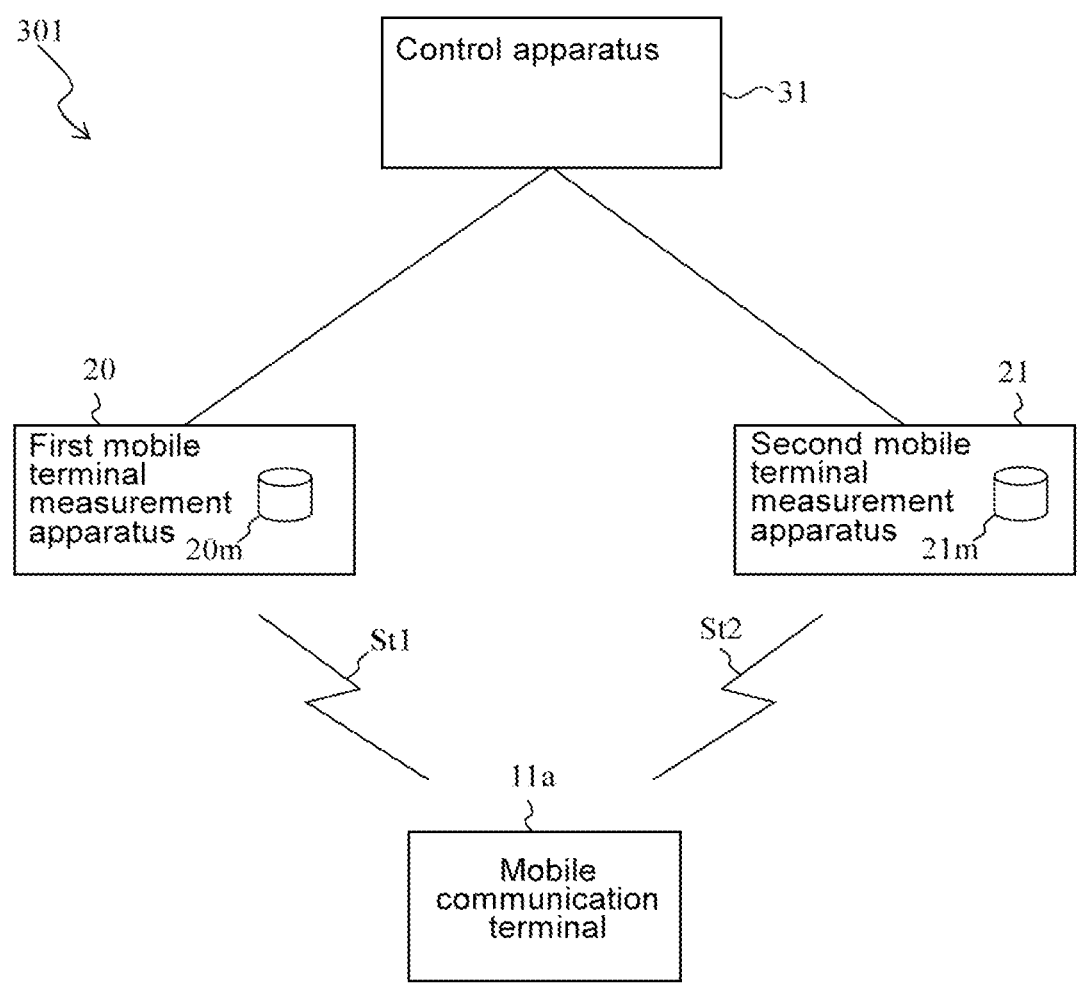
FIG. 17 is a diagram illustrating a communication terminal measurement system according to the present invention.

FIG. 17 is a diagram illustrating a communication terminal measurement system 301 of the present embodiment. The communication terminal measurement system 301 includes a first mobile terminal measurement apparatus 20 compatible with a first communication standard for mobile communication in which one symbol is composed of a plurality of subcarriers, a second mobile terminal measurement apparatus 21 compatible with a second communication standard for mobile communication in which one symbol is composed of a plurality of subcarriers, and a control apparatus 31 that controls the first mobile terminal measurement apparatus 20 and the second mobile terminal measurement apparatus 21. The communication terminal measurement system 301 tests a mobile communication terminal 11a compatible with the first communication standard and the second communication standard by transmitting and receiving test signals (St1, St2) between the mobile communication terminal 11a and the first mobile terminal measurement apparatus 20 and the second mobile terminal measurement apparatus 21. The test of the mobile communication terminal 11a is, for example, measurement of downlink throughput.

The first mobile terminal measurement apparatus 20 has a first storage unit 20m that stores first frequency band information about the test signal St1 of the first communication standard. The second mobile terminal measurement apparatus 21 has a second storage unit 21m that stores second frequency band information about the test signal St2 of the second communication standard.

The second storage unit 21m further stores downlink data channel information which is a resource block (RB) occupied by the downlink data signal of the second frequency band from the second mobile terminal measurement apparatus 21 to the mobile communication terminal 11a.

The control apparatus 31 acquires the second frequency band information and the downlink data channel information from the second storage unit 21m, and performs output control for turning off an output of the test signal St1 of the first communication standard for a band in which a resource block based on downlink data channel information is present, with respect to the first mobile terminal measurement apparatus 20, when the first frequency band and the second frequency band overlap.

Further, the downlink data channel information may be a start position of the resource block on a lowest frequency side and the number of the resource blocks.

Figure 18:
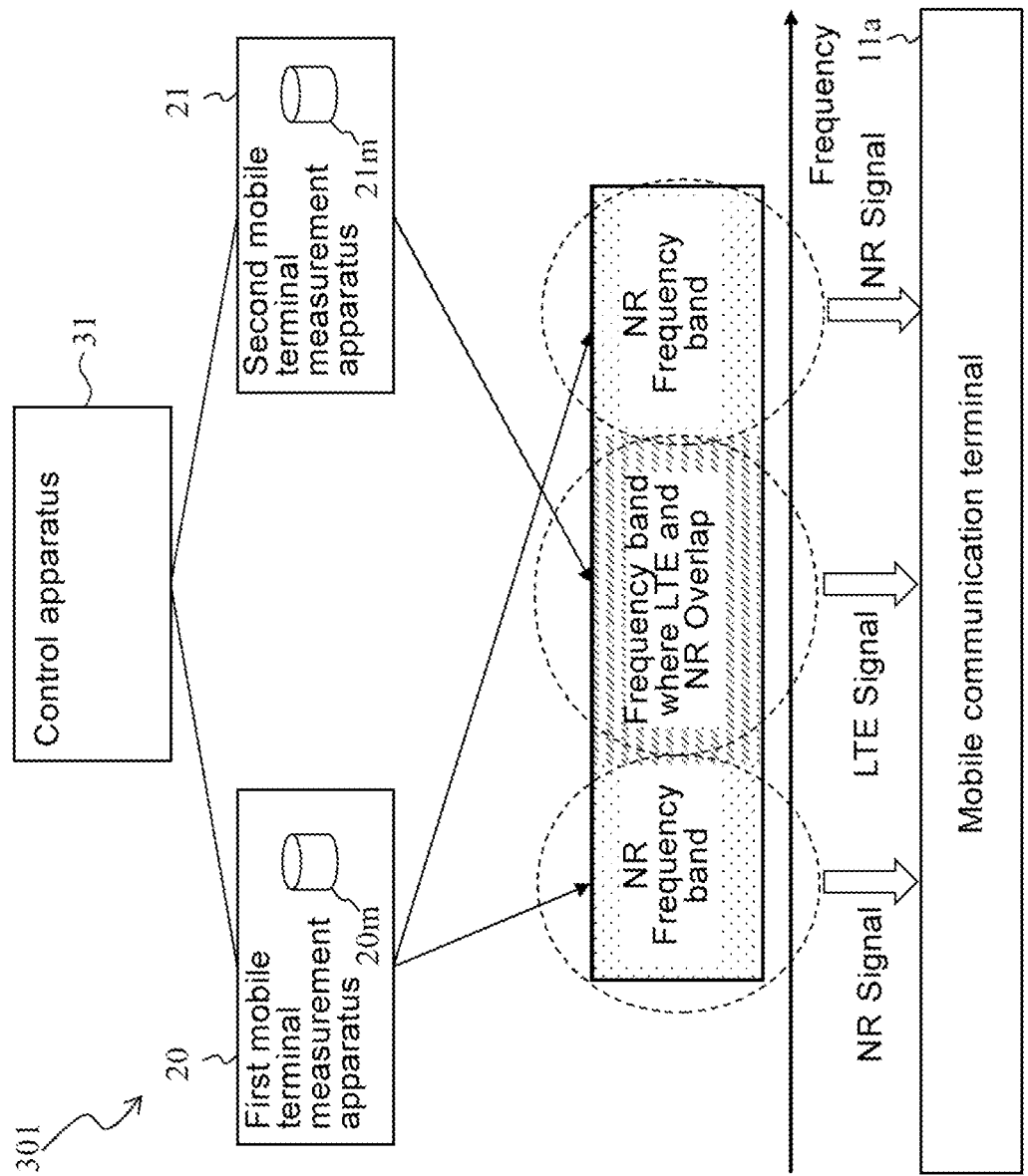
FIG. 18 is a diagram illustrating requirements for a control apparatus.

In the present embodiment, the case where the first communication standard is NR (5G) and the second communication standard is LTE (4G) will be described. The requirements for the control apparatus 31 in this case will be described with reference to FIG. 18. As shown in FIG. 18, with respect to the frequency band where LTE and NR overlap, when the mobile terminal measurement apparatus 21 transmits LTE signals, the control apparatus 31 needs to allow the mobile terminal measurement apparatus 20 to transmit NR signals while avoiding the LTE band, and the LTE to use the band.

Figure 19:
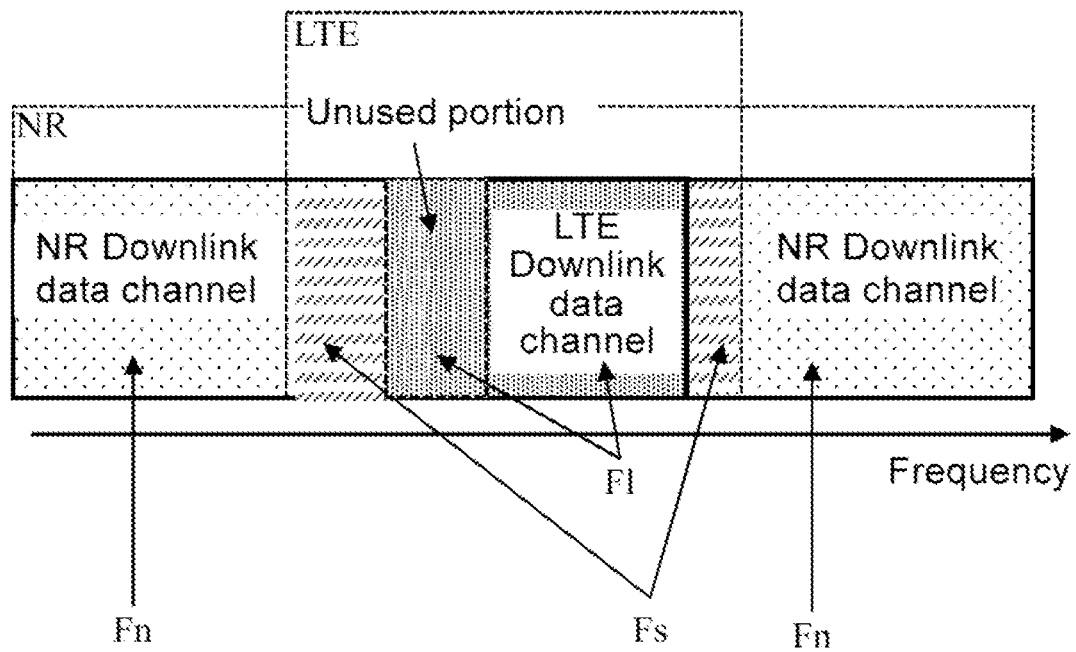
FIG. 19 is a diagram illustrating frequency bands.

FIG. 19 is a diagram specifically illustrating frequency bands of NR and LTE in the present embodiment. As shown in FIG. 19, the frequency bands of NR and LTE overlap. The frequency Fn in the frequency bands which do not overlap is used for the downlink data of NR. Further, the frequency Fs present in a part of the section, where the frequency bands overlap, is used for the LTE reference signal. The reference signal is a Cell specific Reference Signal (CRS), which is a unique signal used for measuring downlink reception quality and the like. If the NR downlink data signal and the LTE reference signal interfere with each other, the data will be damaged, so that the NR downlink data is not transmitted at the frequency Fs.

On the other hand, the frequency Fl is present in the other part of the section where the frequency bands overlap. The frequency Fl is used for LTE downlink data. When the downlink data of NR is transmitted at the frequency Fl, the LTE and NR signals interfere with each other and the data is damaged. Therefore, it is desirable that the downlink data of the NR is not transmitted at the frequency Fl. However, with respect to the frequency Fl, the entire band is not used constantly, and there may be a band (resource block) in the frequency Fl that is not used for transmitting downlink data. Therefore, only the frequency actually used for transmitting the downlink data of LTE is redefined as the new frequency Fl, and the frequencies other than the new frequency Fl are used for the downlink data signal of NR (test signal St1), so that the frequency utilization efficiency can be increased without the downlink data signals of LTE and NR interfering with each other.

Figure 20:
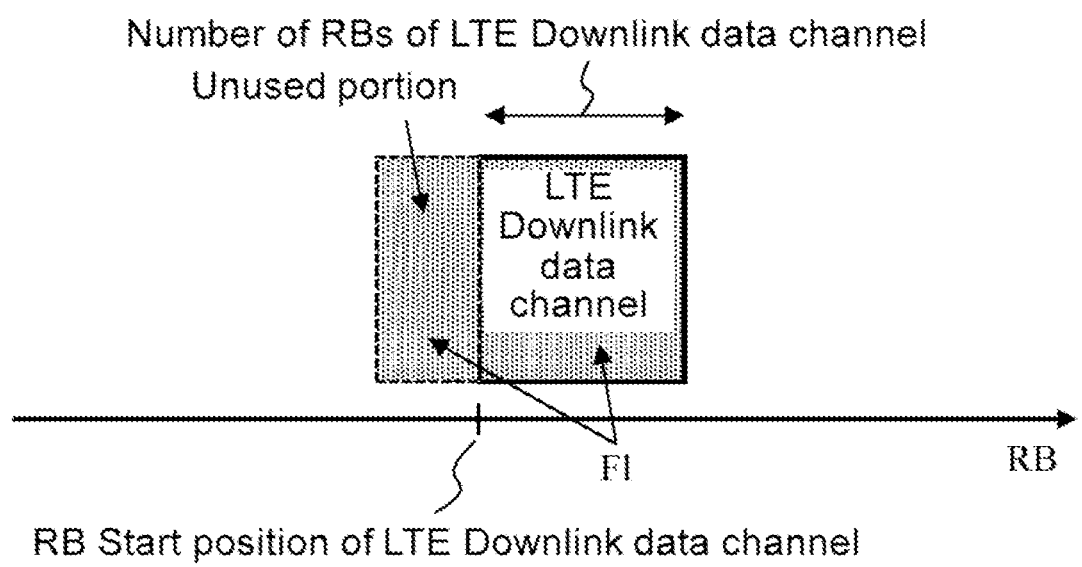
FIG. 20 is a diagram illustrating downlink data channel information of LTE.

FIG. 20 is a diagram illustrating downlink data channel information of LTE. In order for the first mobile terminal measurement apparatus 20 to transmit the downlink data signal in a frequency band that is not used for transmitting the LTE downlink data, the first mobile terminal measurement apparatus 20 needs to acquire the downlink data channel information indicating resource block (RB) occupied by LTE downlink data signal as shown in FIG. 20, for example, the RB start position and the number of RBs of the LTE downlink data channel. LTE downlink data channel information is stored in the second storage unit 21m of the second mobile terminal measurement apparatus 21. Therefore, the control apparatus 31 acquires the downlink data channel information from the second storage unit 21m of the second mobile terminal measurement apparatus 21.

Specifically, the second storage unit 21m stores "DL Center Channel (median frequency)" and "DL Channel Bandwidth (frequency bandwidth)" as the second frequency band information (LTE frequency band information), stores "DL RMC-Starting RB" as the start position of the resource block, and stores "DLRMC-Number of RB" as the number of the resource blocks.

Since these parameters are for LTE, the control apparatus 31 converts these parameters into parameters for NR. Specifically, the control apparatus 31 uses "DL Center Channel" as "LTE DL Channel", uses "DL Channel Bandwidth" as "LTE Channel Bandwidth", uses "DL RMC-Starting RB" as "LTE DL Starting RB", and uses "DLRMC-Number of RB" as "LTE DL Number of RB".

Subsequently, the control apparatus 31 performs "output control". A specific example of the "output control" will be described.

The control apparatus 31 inputs, for example, the converted parameters as a Radio Resource Control (RRC), to the storage unit 20m of the first mobile terminal measurement apparatus 20. The first mobile terminal measurement apparatus 20 outputs a downlink data signal (test signal St1) according to the parameters input to the storage unit 20m so as to avoid the resource block occupied by the LTE downlink data signal.

Figure 21:
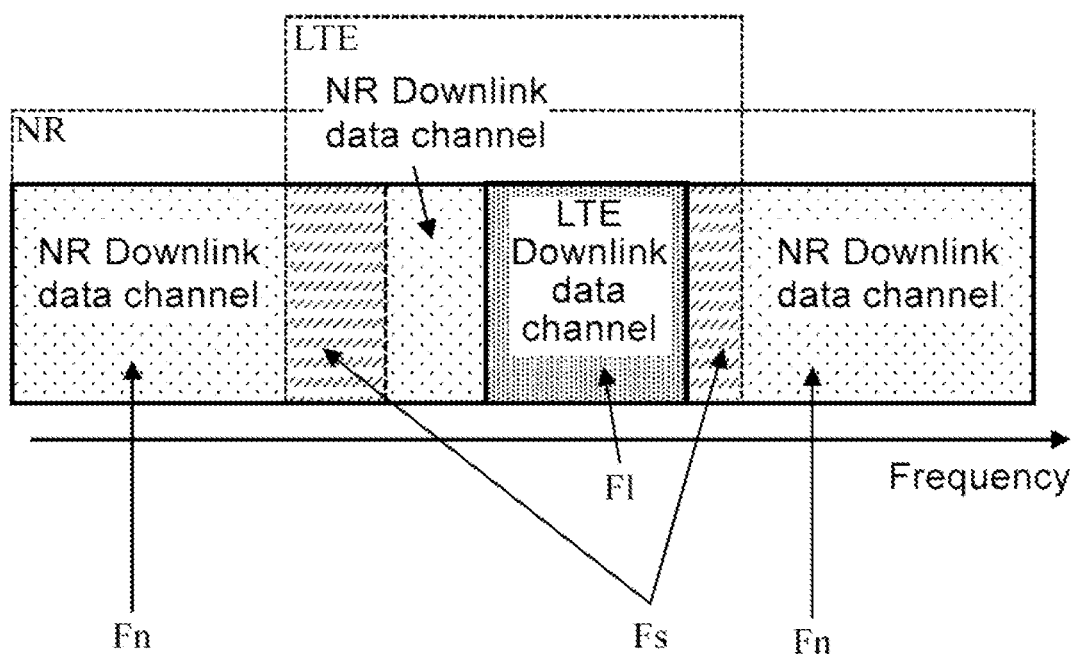
FIG. 21 is a diagram illustrating an effect of the communication terminal measurement system according to the present invention.

FIG. 21 is a diagram illustrating the effect of the communication terminal measurement system 301. As shown in FIG. 21, in the communication terminal measurement system 301, in the band where the LTE frequency band and the NR frequency band overlap, the control apparatus 31 acquires downlink data channel information from the second storage unit 21m of the second mobile terminal measurement apparatus 21, and inputs parameters for avoiding the resource block occupied by the LTE downlink data signal to the storage unit 20m of the first mobile terminal measurement apparatus 20, whereby improving the frequency utilization efficiency at the time of testing the mobile communication terminal 11a.

Further, the communication terminal measurement system 301 acquires only necessary parameters from the second storage unit 21m of the second mobile terminal measurement apparatus 21, and inputs the acquired parameters to the first storage unit 20m of the first mobile terminal measurement apparatus 20, thereby reducing the amount of communication from the second mobile terminal measurement apparatus 21 to the first mobile terminal measurement apparatus 20 and the amount of information processing of the control apparatus 31.

In the above description, the communication terminal measurement system 301 of the present embodiment does not transmit the downlink data of the NR for the frequency Fs shown in FIG. 21, but as in Embodiment 5 or 6, subcarriers of the LTE frequency Fs which are not occupied by the reference signal may be used for the downlink data signal of NR (test signal SU). The same applies to the subsequent embodiments.

Thus, the second frequency band can be used for the test signal of the first communication standard while avoiding the reference signal, and when the mobile communication terminal 11a is tested, the frequency utilization efficiency can be further improved without the test signal of the first communication standard interfering with the second reference signal and the downlink data signal.

Embodiment 11

Figure 22:
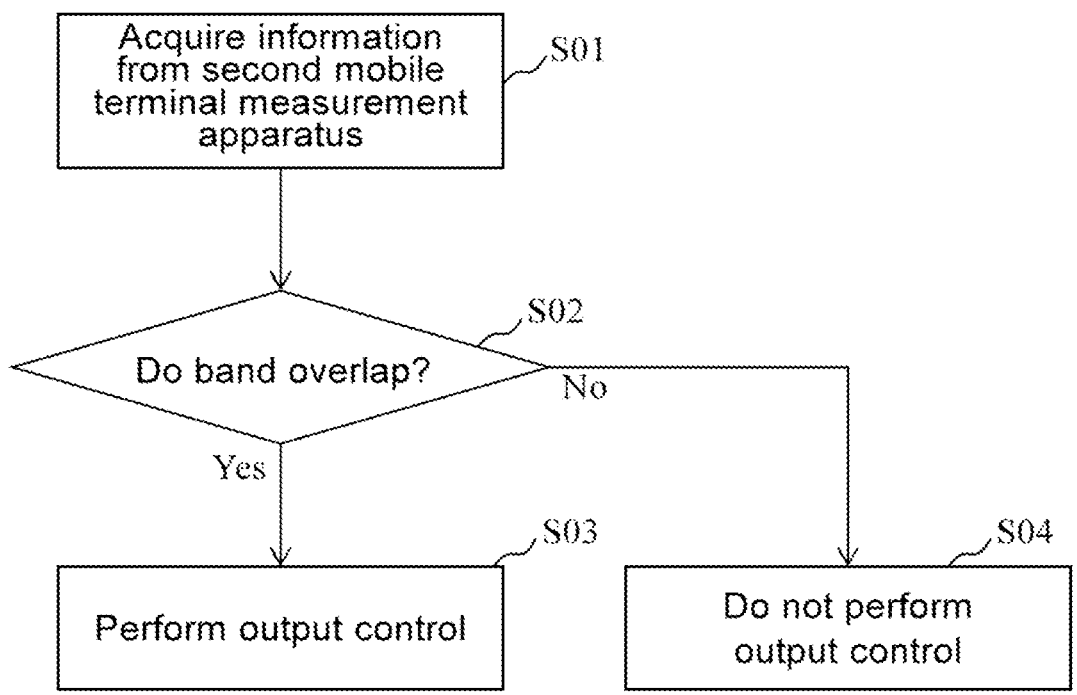
FIG. 22 is a diagram illustrating a communication terminal test method according to the present invention.

FIG. 22 is a diagram illustrating a communication terminal test method performed by the communication terminal measurement system 301 of the present embodiment. The communication terminal test method includes a step (S01) of acquiring the second frequency band information and the downlink data channel information from the second storage unit 21m, a step (S02) of checking the overlap between the first frequency band and the second frequency band, and a step (S03) of performing output control for turning off an output of the test signal St1 of the first communication standard for the band in which the resource block based on the downlink data channel information is present, with respect to the first mobile terminal measurement apparatus 20, when the first frequency band and the second frequency band overlap.

Specifically, first, in step SOL the control apparatus 31 acquires the second frequency band information (LTE frequency band represented by frequencies Fl and Fs in FIG. 19) and the downlink data channel information of FIG. 20, from the second storage unit 21m of the second mobile terminal measurement apparatus 21.

Subsequently, in step S02, the control apparatus 31 checks whether or not the first frequency band (NR frequency band) and the second frequency band (LTE frequency band) overlap. Here, the first frequency band may be preset, or may be acquired from the first storage unit 20m of the first mobile terminal measurement apparatus 20, by the control apparatus 31.

When the first frequency band and the second frequency band overlap ("Yes" in step S02), the control apparatus 31 performs the output control, that is, inputs parameters for avoiding the resource block occupied by the downlink data signal in the second frequency band from the second mobile terminal measurement apparatus 21 to the mobile communication terminal 11a, to the first storage unit 20m of the first mobile terminal measurement apparatus 20 (step S03). Thus, the first mobile terminal measurement apparatus 20 outputs a downlink data signal (test signal St1) according to the parameters input to the storage unit 20m so as to avoid the resource block occupied by the downlink data signal in the second frequency band from the second mobile terminal measurement apparatus 21 to the mobile communication terminal 11a.

On the other hand, when the first frequency band and the second frequency band do not overlap ("No" in step S02), the control apparatus 31 does not perform the output control (step S04). The case where the first frequency band and the second frequency band do not overlap includes the case where the second mobile terminal measurement apparatus 21 does not output the test signal St2 of the second communication standard to the mobile communication terminal 11a. In such a case, the first mobile terminal measurement apparatus 20 outputs a downlink data signal (test signal St1) by using the entire first frequency band.

As described above, in the communication terminal test method of the present embodiment, the control apparatus 31 acquires downlink data channel information from the second storage unit 21m of the second mobile terminal measurement apparatus 21, and inputs parameters for avoiding the resource block occupied by the downlink data signal of the second frequency band from the second mobile terminal measurement apparatus 21 to the mobile communication terminal 11a to the storage unit 20m of the first mobile terminal measurement apparatus 20, whereby improving the frequency utilization efficiency at the time of testing the mobile communication terminal 11a.

Embodiment 12

Figure 23:
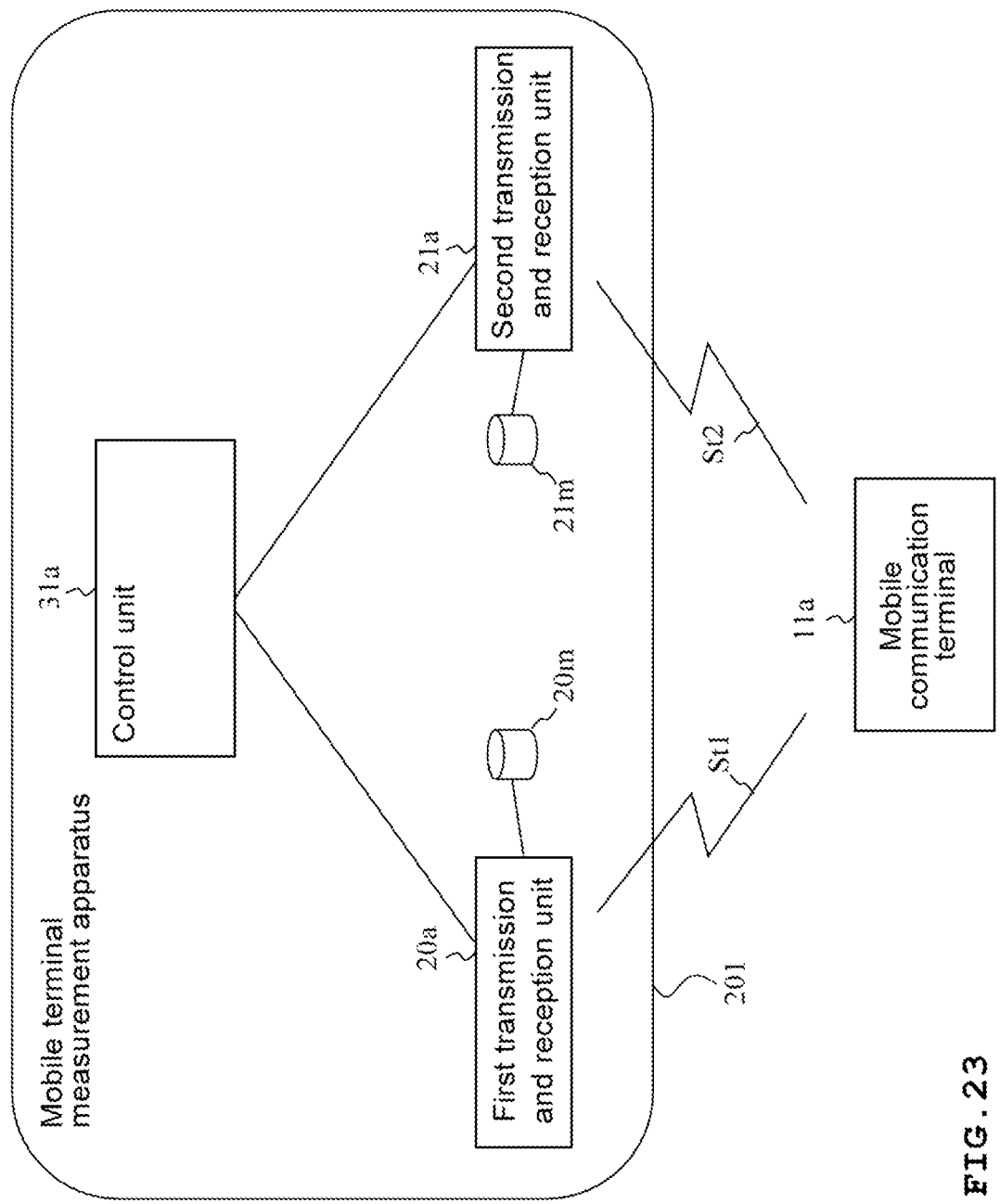
FIG. 23 is a diagram illustrating a communication terminal measurement apparatus according to the present invention.

FIG. 23 is a diagram illustrating the mobile terminal measurement apparatus 201 of the present embodiment. The mobile terminal measurement apparatus 201 includes a first storage unit 20m that corresponds to a first communication standard for mobile communication in which one symbol is composed of a plurality of subcarriers, and stores first frequency band information about a test signal St1 of the first communication standard, a first transmission and reception unit 20a that transmits and receives a test signal compatible with the first communication standard, a second storage unit 21m that corresponds to a second communication standard for mobile communication in which one symbol is composed of a plurality of subcarriers, and stores second frequency band information about a test signal St2 of the second communication standard and downlink data channel information that is a resource block (RB) occupied by the downlink data signal in the second frequency band from the second mobile terminal measurement apparatus 21 to the mobile communication terminal 11a, a second transmission and reception unit 21a that transmits and receives a test signal of the second communication standard, and a control unit 31a that controls the first transmission and reception unit 20a and the second transmission and reception unit 21a.

The mobile terminal measurement apparatus 201 tests the mobile communication terminal 11a compatible with the first communication standard and the second communication standard by transmitting and receiving the test signals (St1, St2) between the mobile communication terminal 11a and the first transmission and reception unit 20a and the second transmission and reception unit 21a.

The control unit 31a acquires the second frequency band information and the downlink data channel information from the second storage unit 21m, and performs output control for turning off an output of the test signal St1 of the first communication standard, with respect to the first transmission and reception unit 20a, for the band in which the resource block based on the downlink data channel information is present, when the first frequency band and the second frequency band overlap.

Even in the present embodiment, as illustrated in FIG. 18, the first communication standard may be NR (5G) and the second communication standard may be LTE (4G). The LTE downlink data channel information is stored in the second storage unit 21m. The specific information stored in the second storage unit 21m is the same as the information described in Embodiment 1. Therefore, the control unit 31a acquires LTE downlink data channel information or the like from the second storage unit 21m and converts these from LTE to NR.

Subsequently, the control unit 31a performs "output control". The "output control" of the present embodiment is the same as the "output control" described in Embodiment 1.

Further, the mobile terminal measurement apparatus 201 can similarly execute the communication terminal test method described with reference to FIG. 22.

Embodiment 13

Figure 24:
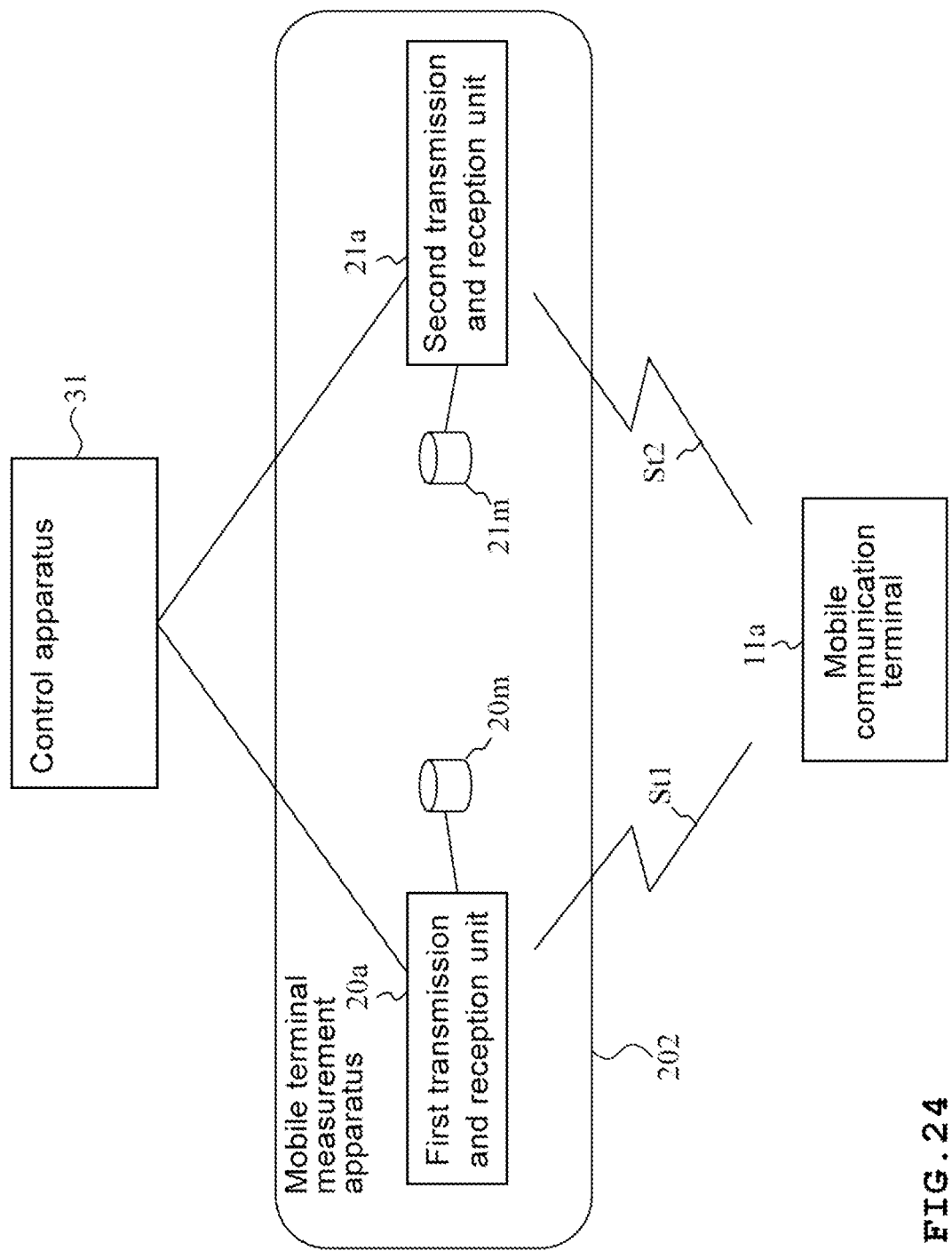
FIG. 24 is a diagram illustrating a communication terminal measurement apparatus according to the present invention.

FIG. 24 is a diagram illustrating the mobile terminal measurement apparatus 202 of the present embodiment. The mobile terminal measurement apparatus 202 includes a first storage unit 20m that corresponds to a first communication standard for mobile communication in which one symbol is composed of a plurality of subcarriers, and stores first frequency band information about a test signal St1 of the first communication standard, a first transmission and reception unit 20a that transmits and receives a test signal compatible with the first communication standard, a second storage unit 21m that corresponds to a second communication standard for mobile communication in which one symbol is composed of a plurality of subcarriers, and stores second frequency band information about a test signal St2 of the second communication standard and downlink data channel information that is a resource block (RB) occupied by the downlink data signal in the second frequency band from the second mobile terminal measurement apparatus 21 to the mobile communication terminal 11a, and a second transmission and reception unit 21a that transmits and receives a test signal of the second communication standard.

The mobile terminal measurement apparatus 202 tests the mobile communication terminal 11a compatible with the first communication standard and the second communication standard by transmitting and receiving the test signals (St1, St2) between the mobile communication terminal 11a and the first transmission and reception unit 20a and the second transmission and reception unit 21a.

The difference between the mobile terminal measurement apparatus 202 and the mobile terminal measurement apparatus 201 of FIG. 23 is that the mobile terminal measurement apparatus 202 does not have the control unit 31a and is controlled by the external control apparatus 31. In other words, with respect to the first transmission and reception unit 20a, the control apparatus 31 acquires the second frequency band information and the downlink data channel information from the second storage unit 21m, and performs output control for turning off an output of the test signal St1 of the first communication standard, for a band in which the resource block based on the downlink data channel information is present, when the first frequency band and the second frequency band overlap.

Even in the present embodiment, as illustrated in FIG. 18, the first communication standard may be NR (5G) and the second communication standard may be LTE (4G). The LTE downlink data channel information is stored in the second storage unit 21m. The specific information stored in the second storage unit 21m is the same as the information described in Embodiment 1. The control apparatus 31 acquires LTE downlink data channel information or the like from the second storage unit 21m and converts these from LTE to NR.

Subsequently, the control apparatus 31 performs "output control". The "output control" of the present embodiment is the same as the "output control" described in Embodiment 1.

Further, the mobile terminal measurement apparatus 202 can similarly execute the communication terminal test method described with reference to FIG. 22.

In the present embodiment, the mobile terminal measurement apparatus 202 incorporating the first storage unit 20m and the second storage unit 21m has been described, but a configuration in which the control apparatus 31 includes at least one of the first storage unit 20m and the second storage unit 21m works in the same manner as described above.

Figure 25:
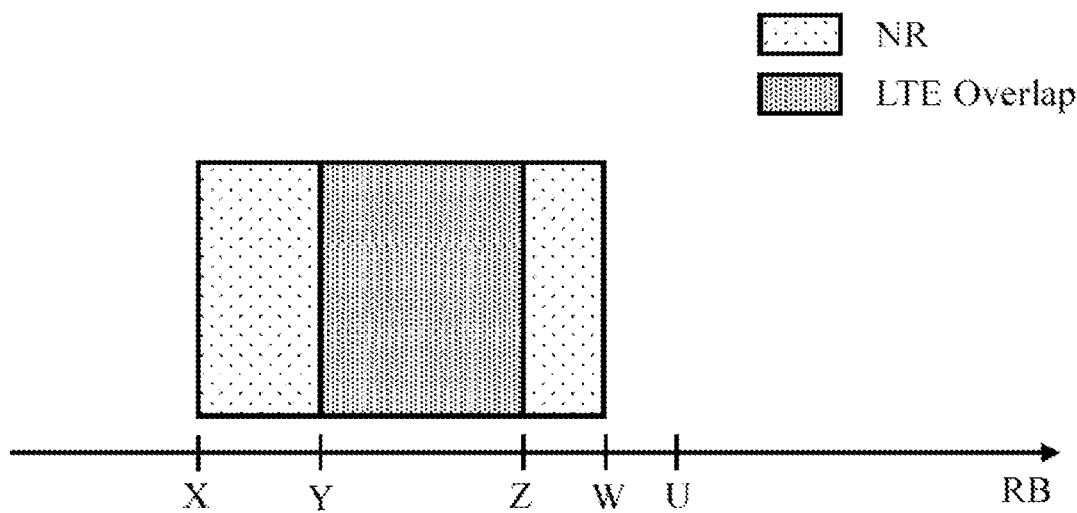
FIG. 25 is a diagram illustrating RB after output control.

When the output control described in the present embodiment is performed, the numbers of RBs occupied respectively by NR and LTE are collected. The collected results will be described with reference to FIGS. 25 to 30. First, the expression format of RBs occupied respectively by NR and LTE will be described with reference to FIG. 25. In FIG. 25, the horizontal axis is the RB number. X indicates the start position of RB of NR. Y indicates the start position of RB of LTE. Z indicates the end position of RB of LTE. W indicates the end position of RB of NR, and is not displayed when it is smaller than Z. U indicates the maximum RB that NR can take and is not displayed when it is equal to W or Z.

Figure 26:
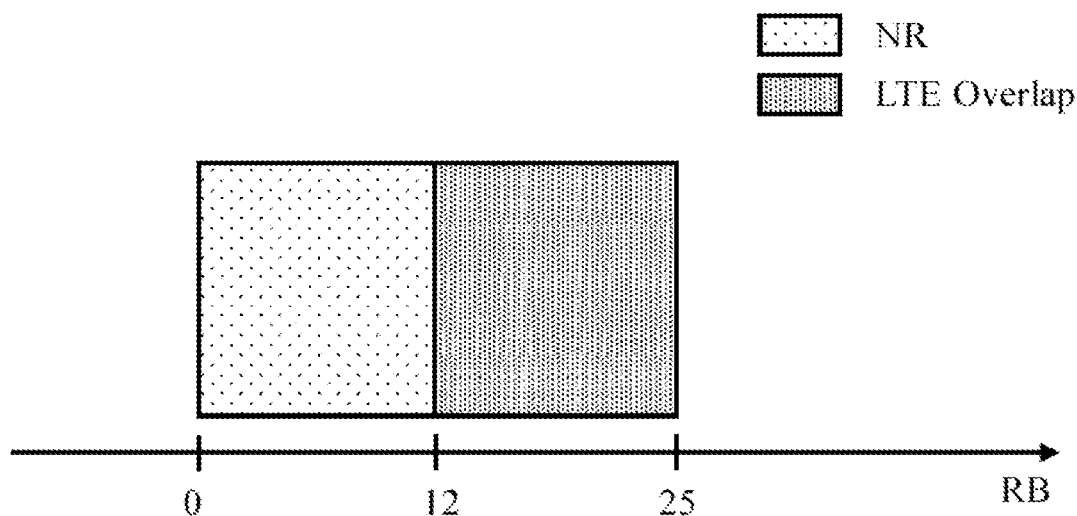
FIG. 26 is a diagram illustrating RB after output control.
Figure 27:
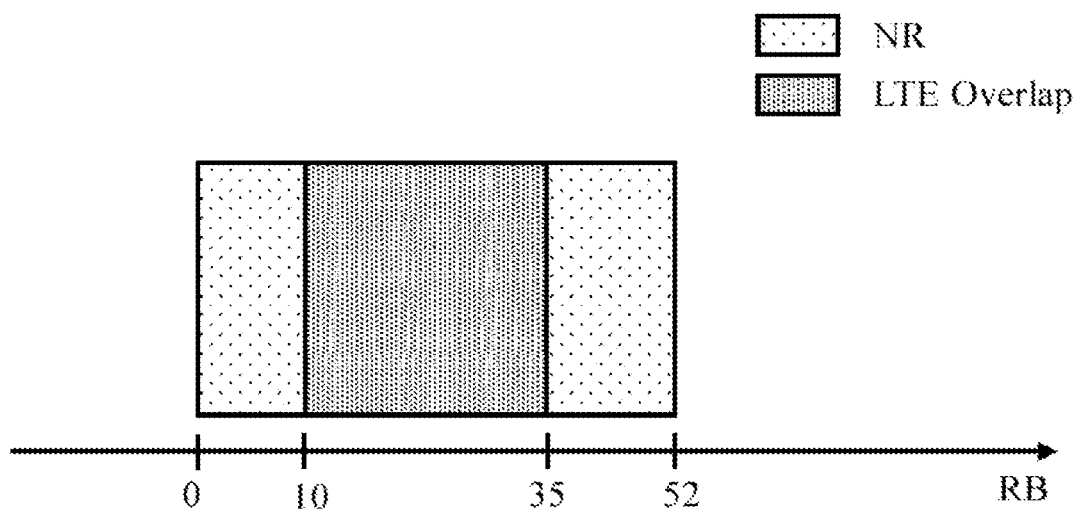
FIG. 27 is a diagram illustrating RB after output control.
Figure 28:
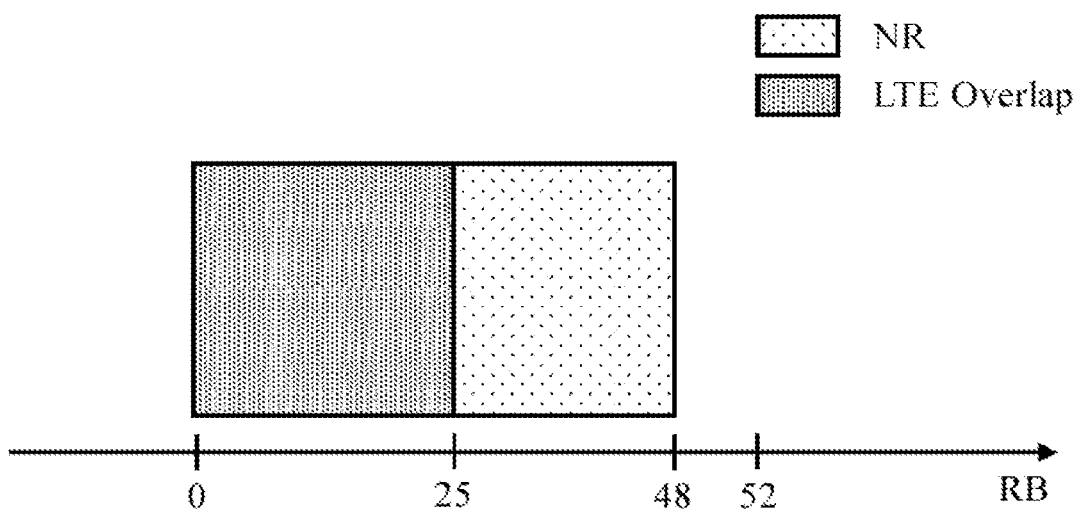
FIG. 28 is a diagram illustrating RB after output control.
Figure 29:
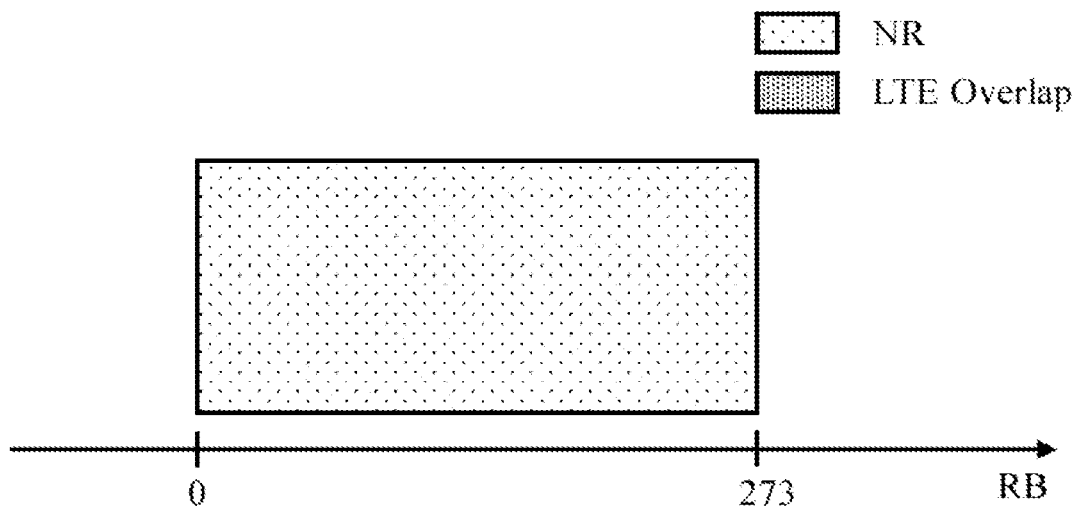
FIG. 29 is a diagram illustrating RB after output control.
Figure 30:
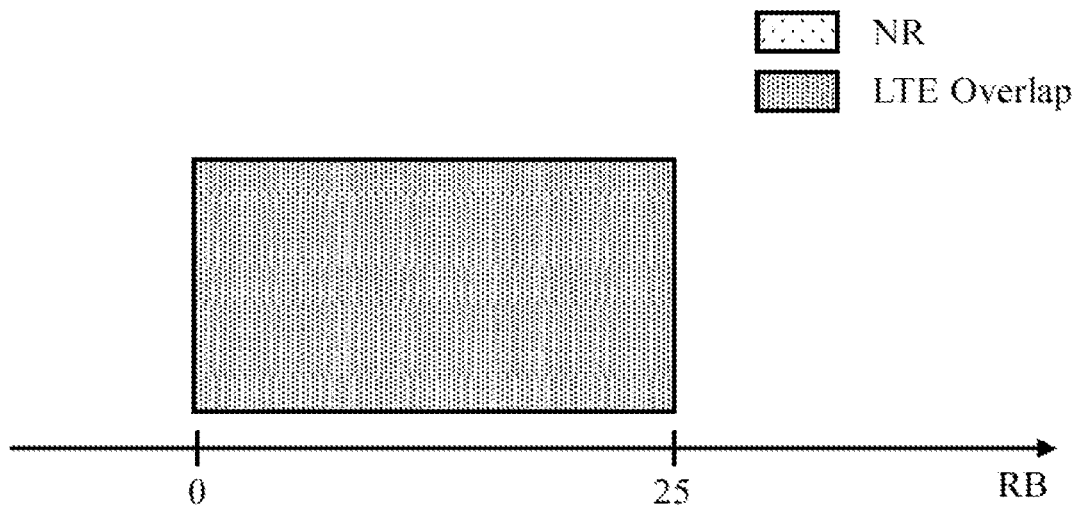
FIG. 30 is a diagram illustrating RB after output control.

The results of collecting the RB numbers occupied respectively by NR and LTE are shown in FIGS. 26 to 30. FIG. 26 shows a case where the NR occupies the lower RB numbers (0 to 11) and the LTE occupies the higher RB numbers (13 to 24). FIG. 27 shows a state where the RBs (0 to 51) of NR include the RBs (10 to 34) of LTE. FIG. 28 shows a case where LTE occupies the lower RB numbers (0 to 24) and NR occupies the higher RB numbers (26 to 47). FIG. 29 shows a case where the RBs of LTE are not assigned to the RBs (0 to 272) of NR. FIG. 30 shows a case where NR is not assigned to RBs (0 to 24) of LTE, or RBs of NR are included in the RBs of LTE. Since this output control is also applied to Embodiments 10 to 12, the same result can be obtained.

DESCRIPTION OF REFERENCE NUMERALS AND SIGNS

11a: Mobile communication terminal
20: First mobile terminal measurement apparatus (mobile terminal measurement apparatus compatible with first communication standard)
20a: First transmission and reception unit
20m: First storage unit
21: Second mobile terminal measurement apparatus (mobile terminal measurement apparatus compatible with second communication standard)
21a: Second transmission and reception unit
21m: Second storage unit
31: control apparatus
31a: Control unit
32: Input unit
33: Control unit
201, 202: communication terminal measurement apparatus
301, 302: Communication terminal measurement system

What is claimed is:

1. A communication terminal measurement system comprising:
   a first mobile terminal measurement apparatus compatible with a first communication standard for mobile communication in which one symbol is composed of a plurality of subcarriers;
   a second mobile terminal measurement apparatus compatible with a second communication standard for mobile communication in which one symbol is composed of a plurality of subcarriers; and
   a controller configured to control the first mobile terminal measurement apparatus and the second mobile terminal measurement apparatus to test a mobile communication terminal compatible with the first communication standard and the second communication standard, by transmitting and receiving test signals between the mobile communication terminal and either of the first mobile terminal measurement apparatus or the second mobile terminal measurement apparatus, wherein:
   the first mobile terminal measurement apparatus has a first memory configured to store first frequency band information about the test signal of the first communication standard,
   the second mobile terminal measurement apparatus has a second memory configured to store second frequency band information about the test signal of the second communication standard, and the controller is further configured to:
  acquire the second frequency band information from the second memory, and
  perform output control for turning off an output of the test signal of the first communication standard for a part of the first frequency band, with respect to the first mobile terminal measurement apparatus, when the first frequency band and the second frequency band overlap.

2. The communication terminal measurement system according to claim 1, wherein the part of the first frequency band is the second frequency band.

3. The communication terminal measurement system according to claim 2, wherein:
  the first communication standard is NR, and the second communication standard is LTE,
  the second memory is configured to store "DL Center Channel" and "DL Channel Bandwidth" as the second frequency band information, and
  the controller is configured to use the "DL Center Channel" as "LTE DL Channel", use the "DL Channel Bandwidth" as "LTE Channel Bandwidth", and cause the first mobile terminal measurement apparatus to perform the output control.

4. The communication terminal measurement system according to claim 1, wherein:
  the second memory is further configured to store mapping information in which a reference signal of the second communication standard is represented by the symbols and the subcarriers,
  the controller is further configured to acquire the mapping information from the second memory, and
  the part of the first frequency band is a region in which the reference signal based on the mapping information is disposed.

5. The communication terminal measurement system according to claim 4, wherein the controller is further configured to:
  receive the mapping information, and
  cause the second memory to update the existing mapping information to the received mapping information, and cause the first mobile terminal measurement apparatus to perform the output control based on the updated mapping information.

6. The communication terminal measurement system according to claim 4, wherein:
  the first communication standard is NR, and the second communication standard is LTE,
  the second memory is configured to store "DL Center Channel" and "DL Channel Bandwidth" as the second frequency band information, and store "Antenna Configuration" and "Cell ID" as the mapping information, and
  the controller is configured to:
    use the "DL Center Channel" as "LTE DL Channel", and use the "DL Channel Bandwidth" as "LTE Channel Bandwidth",
    convert the "Antenna Configuration" into "Number of CRS Ports", based on a conversion table,
    convert the "Cell ID" into "LTE v-Shift" by performing surplus operation by 6, and
    cause the first mobile terminal measurement apparatus to perform the output control.

7. The communication terminal measurement system according to claim 4, wherein the region is a subcarrier unit within the symbol.

8. The communication terminal measurement system according to claim 4, wherein the region is a symbol unit.

9. The communication terminal measurement system according to claim 1, wherein:
  the second memory is further configured to store downlink data channel information which is a resource block occupied by a downlink data signal of the second frequency band from the second mobile terminal measurement apparatus to the mobile communication terminal,
  the controller is further configured to acquire the downlink data channel information, and
  the part of the first frequency band is a band in which the resource block based on the downlink data channel information is present.

10. The communication terminal measurement system according to claim 9, wherein the downlink data channel information is a start position of the resource block on a lowest frequency side and the number of the resource blocks.

11. The communication terminal measurement system according to claim 10, wherein:
  the first communication standard is NR, and the second communication standard is LTE,
  the second memory is configured to:
    store "DL Center Channel" and "DL Channel Bandwidth" as the second frequency band information,
    store "DL RMC-Starting RB" as the start position of the resource block, and
    store "DLRMC-Number of RB" as the number of the resource blocks, and
  the controller is further configured to:
    use the "DL Center Channel" as "LTE DL Channel",
    use the "DL Channel Bandwidth" as "LTE Channel Bandwidth",
    use the "DL RMC-Starting RB" as "LTE DL Starting RB",
    use the "DLRMC-Number of RB" as "LTE DL Number of RB", and
    cause the first mobile terminal measurement apparatus to perform the output control.

12. A mobile terminal measurement apparatus comprising:
  a controller;
  a first memory that is compatible with a first communication standard for mobile communication in which one symbol is composed of a plurality of subcarriers, and that is configured to store first frequency band information about a test signal of the first communication standard;
  a first transceiver that is configured to transmit and receive a test signal compatible with the first communication standard;
  a second memory that is compatible with a second communication standard for mobile communication in which one symbol is composed of a plurality of subcarriers, and that is configured to store second frequency band information about a test signal of the second communication standard; and
  a second transceiver that is configured to transmit and receive the test signal of the second communication standard, wherein:
    when testing a mobile communication terminal compatible with the first communication standard and the second communication standard by transmitting and receiving the test signals between the mobile communication terminal and either of the first transceiver or the second transceiver, the controller is configured to:
acquire the second frequency band information from the second memory, and
perform output control for turning off an output of the test signal of the first communication standard for a part of the first frequency band, when the first frequency band and the second frequency band overlap.

13. The communication terminal measurement apparatus according to claim 12, wherein the part of the first frequency band is the second frequency band.

14. The communication terminal measurement apparatus according to claim 12, wherein:
the second memory is further configured to store mapping information in which a reference signal of the second communication standard is represented by the symbols and the subcarriers,
the controller is further configured to acquire the mapping information from the second memory, and
the part of the first frequency band is a region in which the reference signal based on the mapping information is disposed.

15. The communication terminal measurement apparatus according to claim 12, wherein:
the second memory is further configured to store downlink data channel information which is a resource block occupied by a downlink data signal of the second frequency band from a second mobile terminal measurement apparatus to the mobile communication terminal,
the controller is further configured to acquire the downlink data channel information, and
the part of the first frequency band is a band in which the resource block based on the downlink data channel information is present.

16. A communication terminal test method which controls a first storage unit that is compatible with a first communication standard for mobile communication in which one symbol is composed of a plurality of subcarriers, and stores first frequency band information about a test signal of the first communication standard, a first transmission and reception unit that transmits and receives a test signal compatible with the first communication standard, a second storage unit that is compatible with a second communication standard for mobile communication in which one symbol is composed of a plurality of subcarriers, and stores second frequency band information about a test signal of the second communication standard, and a second transmission and reception unit that transmits and receives the test signal of the second communication standard, and tests a mobile communication terminal compatible with the first communication standard and the second communication standard by transmitting and receiving the test signals between the mobile communication terminal and either of the first transmission and reception unit or the second transmission and reception unit, the method comprising:
acquiring the second frequency band information from the second storage unit;
checking overlap between the first frequency band and the second frequency band; and
performing output control for turning off an output of the test signal of the first communication standard for a part of the first frequency band, with respect to the first transmission and reception unit, when the first frequency band and the second frequency band overlap.

17. The communication terminal test method according to claim 16, wherein the part of the first frequency band is the second frequency band.

18. The communication terminal test method according to claim 16, wherein:
the second storage unit further stores mapping information in which a reference signal of the second communication standard is represented by the symbols and the subcarriers,
when the second frequency band information is acquired from the second storage unit, the mapping information is further acquired from the second storage unit, and
the part of the first frequency band is a region in which the reference signal based on the mapping information is disposed.

19. The communication terminal test method according to claim 16, wherein:
the second storage unit further stores downlink data channel information which is a resource block occupied by a downlink data signal of the second frequency band from a second mobile terminal measurement apparatus to the mobile communication terminal,
when the second frequency band information is acquired from the second storage unit, the downlink data channel information is further acquired, and
the part of the first frequency band is a band in which the resource block based on the downlink data channel information is present.

* * * * *